US010944604B2

United States Patent
Bai et al.

(10) Patent No.: US 10,944,604 B2
(45) Date of Patent: Mar. 9, 2021

(54) SYSTEM AND METHOD FOR COMMUNICATION SUB-CHANNEL BANDWIDTH ADJUSTMENT IN A MILLIMETER WAVE (MMW) COMMUNICATION SYSTEM

(71) Applicant: QUALCOMM INCORPORATED, San Diego, CA (US)

(72) Inventors: Tianyang Bai, Bridgewater, NJ (US); Juergen Cezanne, Ocean Township, NJ (US); Navid Abedini, Somerset, NJ (US); Bilal Sadiq, Basking Ridge, NJ (US); Junyi Li, Chester, NJ (US); Vasanthan Raghavan, West Windsor Township, NJ (US); Jung Ho Ryu, Fort Lee, NJ (US); Kiran Venugopal, Raritan, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/412,502

(22) Filed: May 15, 2019

(65) Prior Publication Data

US 2019/0363919 A1   Nov. 28, 2019

Related U.S. Application Data

(60) Provisional application No. 62/676,462, filed on May 25, 2018.

(51) Int. Cl.
| | | |
|---|---|---|
| H04W 72/04 | (2009.01) | |
| H04L 27/26 | (2006.01) | |
| H04W 36/06 | (2009.01) | |

(52) U.S. Cl.
CPC ......... H04L 27/2607 (2013.01); H04W 36/06 (2013.01)

(58) Field of Classification Search
None
See application file for complete search history.

(56) References Cited

U.S. PATENT DOCUMENTS

2013/0315321 A1   11/2013   Rajagopal et al.
2016/0338081 A1*  11/2016   Jiang ..................... H04L 1/00
(Continued)

FOREIGN PATENT DOCUMENTS

WO   2017083489 A1   5/2017

OTHER PUBLICATIONS

Huawei et al., "Discussion on Time Domain Structures", 3GPP Draft; R1-166104, 3rd Generation Partnership Project (3GPP), Mobile Competence Centre, 650, Route Des Lucioles ; F-06921 Sophia-Antipolis Cedex, France, vol. RAN WG1, No. Gothenburg, Sweden; 20160822-20160826, Aug. 21, 2016 (Aug. 21, 2016), 6 Pages, XP051125215, Retrieved from the Internet: URL: http://www.3gpp.org/ftp/Meetings_3GPP_SYNC/RAN1/Docs/ [retrieved on Aug. 21, 2016], Section 2.3.
(Continued)

Primary Examiner — Brandon M Renner
(74) Attorney, Agent, or Firm — Smith Tempel Blaha LLC/Qualcomm Incorporated

(57) ABSTRACT

A method for adjusting communication symbol sub-carrier frequency spacing based on a communication symbol priority at a communication beam transition location includes identifying a communication beam transition location in time in a communication transmission time interval (TTI) where a communication beam transition will occur, and determining a configuration of a communication symbol at least partly based on the identified communication beam transition location and a priority of the communication symbol. The configuration may comprise an extended guard period created by adjusting the sub-carrier frequency spac- (Continued)

ing of at least one of the symbols that occurs at least one of immediately following the communication beam transition location and immediately preceding the communication beam transition location, so that the sub-carrier frequency spacing for the symbol that occurs at least one of immediately following the communication beam transition location and immediately preceding the beam transition location is different than a sub-carrier frequency spacing for a symbol that does not at least one of immediately precede the communication beam transition location and immediately follow the communication beam transition location.

56 Claims, 20 Drawing Sheets

(56) References Cited

U.S. PATENT DOCUMENTS

| | | | |
|---|---|---|---|
| 2017/0311276 A1* | 10/2017 | Tsai | H04B 7/0695 |
| 2018/0343155 A1* | 11/2018 | Zeng | H04L 5/0048 |
| 2018/0367355 A1* | 12/2018 | Pan | H04L 27/2646 |
| 2019/0141704 A1* | 5/2019 | Liu | H04W 72/12 |
| 2019/0150190 A1* | 5/2019 | Kim | H04W 56/00 370/329 |
| 2019/0182821 A1* | 6/2019 | You | H04B 7/0695 |
| 2019/0223175 A1* | 7/2019 | Hakola | H04W 72/0446 |
| 2019/0357236 A1* | 11/2019 | Fu | H04L 5/005 |

OTHER PUBLICATIONS

International Search Report and Written Opinion—PCT/US2019/032554—ISA/EPO—dated Aug. 7, 2019.
Nokia et al., "On CSI-RS Design for DL Beam Management", 3GPP Draft; R1-1705969, 3rd Generation Partnership Project (3GPP), Mobile Competence Centre, 650, Route Des Lucioles ; F-06921 Sophia-Antipolis Cedex, France, vol. RAN WG1, No. Spokane, WA, USA; 20170403-20170407, Apr. 2, 2017 (Apr. 2, 2017), 13 Pages, XP051244078, Retrieved from the Internet: http://www.3gpp.org/ftp/Meetings_3GPP_SYNC/RAN1/Docs/ [retrieved on Apr. 2, 2017], Section 4.

* cited by examiner

SYSTEM AND METHOD FOR COMMUNICATION SUB-CHANNEL BANDWIDTH ADJUSTMENT IN A MILLIMETER WAVE (MMW) COMMUNICATION SYSTEM

RELATED APPLICATIONS

This application claims priority to and the benefit of U.S. Provisional Patent Application No. 62/676,462, entitled "SYSTEM AND METHOD FOR COMMUNICATION SUB-CHANNEL BANDWIDTH ADJUSTMENT TO REDUCE INTERSYMBOL INTERFERENCE (ISI) DURING BEAM TRANSITION IN A MILLIMETER WAVE (MMW) COMMUNICATION SYSTEM," filed May 25, 2018, the contents of which are hereby incorporated herein by reference in its entirety as if fully set forth below and for all applicable purposes.

FIELD

The present disclosure relates to wireless communications, and more particularly, to communication sub-channel bandwidth adjustment during communication beam transition in a millimeter wave (mmW) wireless communication system.

BACKGROUND

Wireless communications systems are widely deployed to provide various types of communications content such as voice, video, packet data, messaging, broadcast, and so on. These systems may be multiple-access systems capable of supporting communication with multiple users by sharing the available system resources (e.g., time, frequency, and power). By way of example, a wireless multiple-access communications system may include a number of base stations, each simultaneously supporting communication for multiple communication devices, each otherwise known as user equipment (UE). A base station may communicate with one or more UEs on downlink channels (e.g., for transmissions from a base station to a UE) and uplink channels (e.g., for transmissions from a UE to a base station). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the DL, SC-FDMA on the UL, and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies. An example of an improvement to LTE technology is referred to as 5G. The term 5G, or new radio (NR), represents an evolution of LTE technology including, for example, various improvements to the wireless interface, processing improvements, and the enablement of higher bandwidth to provide additional features and connectivity. A feature of 5G is the use of millimeter wave (mmW) frequency bands and beam forming. Beam forming concentrates the radio energy in a narrow, selective (i.e., non-omnidirectional) pattern to increase gain without having to increase transmission power.

In a 5G mmW communication system, the transmitter and receiver continually determine the "best" beam path. That is, to optimize communication link quality between the transmitter and receiver, the transmitter forms an outgoing beam and the receiver forms an incoming beam that together best match the channel propagation conditions. As channel propagation conditions change, the transmitter and the receiver coordinate to transition, or switch, from one communication beam to another. A communication beam on which communication is actively occurring may be referred to as a "serving beam" and a communication beam on which communication is to transition to may be referred to as a "target beam" or a "candidate beam."

A challenge in transitioning from one communication beam to another is that the beamforming is typically performed by radio frequency (RF) components, some of which operate in the analog domain. Transitioning from one beam to another consumes a period of time during which the analog components are reconfigured to operate on the new communication beam. The beam switch time refers to a delay measured from the beam switch command or trigger, to the time it takes the components to reconfigure to the new communication beam, sometimes referred to as settling time. The beam switch time may consume hundreds of nanoseconds (ns), which may exceed the amount of time allocated to a cyclic prefix (CP) portion of a communication symbol, during which beam transition typically occurs. This may cause the CP portion of a communication symbol to exceed (or leak into) the payload portion of the communication symbol and may cause additional intersymbol interference (ISI) in the payload.

Therefore, increasing an amount of time available for communication beam transition is desirable.

SUMMARY

Various implementations of systems, methods, and apparatuses within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that relative dimensions of elements depicted in the drawing figures may not be to scale.

One aspect of the disclosure provides a method for adjusting communication symbol sub-carrier frequency spacing based on a communication symbol priority at a communication beam transition location including identifying a communication beam transition location in time in a communication transmission time interval (TTI) where a communication beam transition will occur, and determining a configuration of a communication symbol at least partly based on the identified communication beam transition location and a priority of the communication symbol. The configuration may comprise an extended guard period created by adjusting the sub-carrier frequency spacing of at least one of the symbols that occurs at least one of immediately following the communication beam transition location and immediately preceding the communication beam transition location, so that the sub-carrier frequency spacing for the symbol that occurs at least one of immediately following the communication beam transition location and immediately preceding the communication beam transition location is different than a sub-carrier frequency spacing for a symbol that does not at least one of immediately precede the communication beam transition location and immediately follow the communication beam transition location.

Another aspect of the disclosure provides a method for adjusting communication symbol sub-carrier frequency spacing based on a communication symbol priority at a communication beam transition location including receiving a signaling indicating at least one of a communication beam transition location and a communication configuration for a transmission time interval (TTI), identifying the communication beam transition location at least in part based on the received signal in the TTI, and determining a configuration of a communication symbol at least partly based on at least one of the received signaling and a predefined method. The configuration may comprise an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

Another aspect of the disclosure provides an apparatus for adjusting communication symbol sub-carrier frequency spacing based on a communication symbol priority at a communication beam transition location including means for identifying a communication beam transition location in time in a communication transmission time interval (TTI) where a communication beam transition will occur, and means for determining a configuration of a communication symbol at least partly based on the identified communication beam transition location and a priority of the communication symbol. The configuration may comprise an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

Another aspect of the disclosure provides an apparatus for adjusting communication symbol sub-carrier frequency spacing based on a communication symbol priority at a communication beam transition location including means for receiving a signaling indicating at least one of a communication beam transition location and a communication configuration for a transmission time interval (TTI), means for identifying the communication beam transition location at least in part based on the received signal in the TTI, and means for determining a configuration of a communication symbol at least partly based on at least one of the received signaling and a predefined method. The configuration may comprise an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described herein may be performed in an order different from that described, and various steps may be added, omitted, or combined. Also, features described with respect to some examples may be combined in other examples.

Examples described below are directed to lengthening a period of time for communication beam transition by adjusting sub-carrier (also referred to as "tone") frequency spacing to provide less frequency bandwidth per tone for selected communication symbols that may follow a communication beam switch location in time and/or precede a communication beam switch location in time. Such selected communication symbols may include, but are not limited to, those carrying a demodulation reference signal (DMRS), channel state information-reference signal (CSI-RS), and a communication having a modulation and coding scheme (MCS) having a high reliability requirement, and other selected signals. As used herein, the terms "beam transition" and "beam switch" may be used interchangeably.

Embodiments include determining a location in time in a transmission time interval (TTI), or in a communication frame, a communication sub-frame, a communication slot, etc., where a beam switch, or a beam transition is to occur, and then determining the content of the communication symbol or symbols immediately preceding the beam switch location and/or immediately following the beam switch location. If the communication symbol or symbols immediately preceding the beam transition location or immediately following the beam transition location are one of selected communication symbols that may benefit from a longer communication beam transition period, then the sub-carrier frequency spacing is adjusted for the selected communication symbol, or communication symbols, resulting in a new communication symbol having a longer length beam transition period within which to perform the beam transition. The longer length beam transition period results in a longer guard period, that may include additional time for the beam transition to occur. The longer guard period may also include the time for a CP to be applied to the communication symbol after the beam transition is complete and before the payload portion of the communication symbol begins, thereby minimizing the chance that the CP may leak into the payload portion of the communication symbol.

Figure 1:
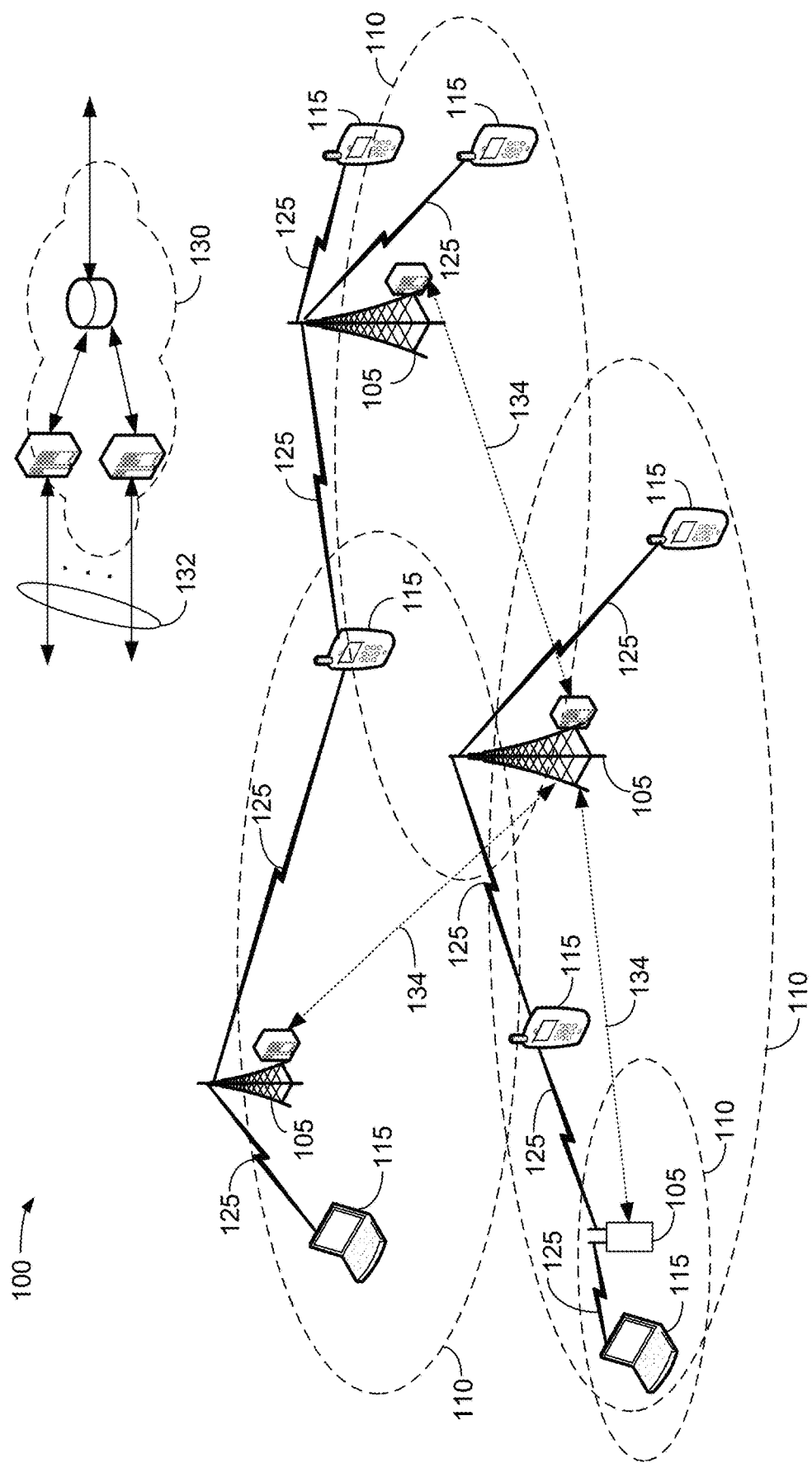
FIG. 1 is a block diagram of an example of a wireless communications system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, base stations 105 may communicate, either directly or indirectly (e.g., through core network 130), with each other over a second set of backhaul links 134 (e.g., X1, etc.), which may be wired or wireless communication links.

Each base station site may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a gNodeB, or some other suitable terminology. The geographic coverage area 110 for a base station 105 may be divided into sectors making up only a portion of the coverage area (not shown). Wireless communications system 100 may include base stations 105 of different types (e.g., macro and/or small cell base stations). There may be overlapping geographic coverage areas 110 for different technologies.

In some examples, wireless communications system 100 may be one or more of an LTE/LTE-A network and a 5G network. In LTE/LTE-A networks, the term evolved Node B (eNB) or in a 5G (also referred to as new radio (NR)) network, the term millimeter wave B (mWB), or gNodeB (gNB) may be generally used to describe base stations 105, while the term UE may be generally used to describe UEs 115. Wireless communications system 100 may be a heterogeneous LTE/LTE-A and 5G network in which different types of eNBs and/or mWBs provide coverage for various geographical regions. For example, each eNB, mWB, gNB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

Wireless communications system 100 may support synchronous or asynchronous operation. For synchronous operation, base stations 105 may have similar frame timing, and transmissions from different base stations may be approximately aligned in time. For asynchronous operation, base stations 105 may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, mWBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some examples, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Figure 2:
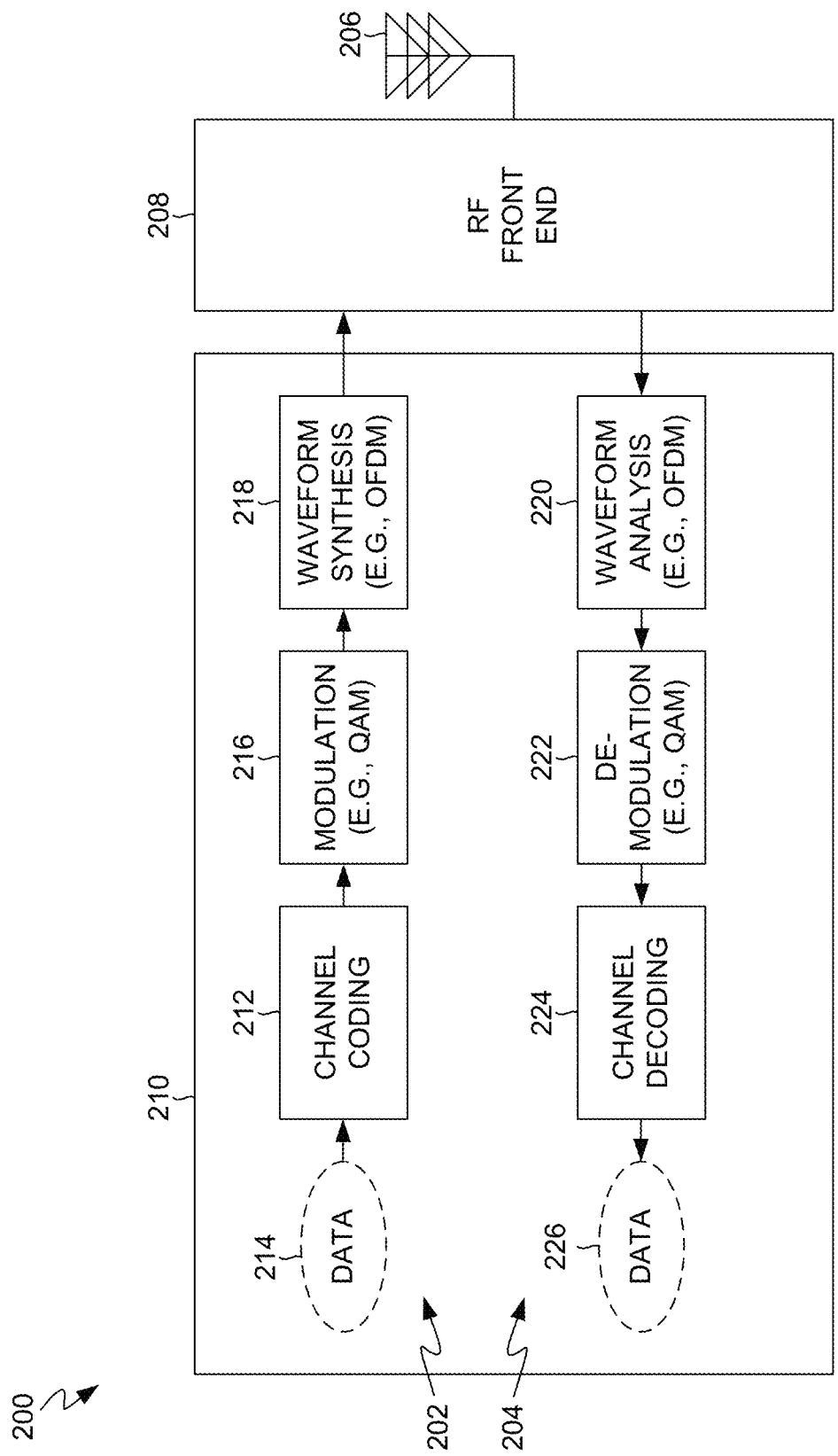
FIG. 2 is a block diagram of an example of a transceiver device or user equipment, in accordance with various aspects of the present disclosure.

FIG. 2 is a block diagram of a UE 200, in accordance with various aspects of the present disclosure. The UE 200 may be an example of one or more aspects of UE 115 described above with reference to FIG. 1. As UE 200 serves as a transceiver, it has a transmitter portion 202 and a receiver portion 204. Although some examples described in this disclosure may relate to transmitting while other examples may relate to receiving, waveform shaping principles described in relation to transmitting also apply to receiving, and waveform shaping principles described in relation to receiving also apply to transmitting.

The UE 200 may include one or more antennas 206, RF front end circuitry 208, and baseband system circuitry 210. Transmitter portion 202 includes channel coding logic 212 that encodes data 214, modulation logic 216 that modulates the encoded data provided by channel coding logic 212, and waveform synthesis logic 218 that synthesizes or generates baseband transmit (TX) signals. The RF front end circuitry 208 upconverts the baseband TX signals provided by waveform synthesis logic 218 to radio frequency (RF) for transmission via antennas 206. Portions of baseband system circuitry 210 that provide data 214 to be transmitted are not shown for purposes of clarity but are well understood by one of ordinary skill in the art. The RF front end circuitry 208 also downconverts RF signals received from antennas 206 to baseband and provides the resulting baseband receive (RX) signals to receiver portion 204. Receiver portion 204 includes waveform analysis logic 220 that analyzes or receives the baseband RX signals, demodulation logic 222 that demodulates the received signals provided by waveform analysis logic 220, and channel decoding logic 224 that decodes the demodulated signals provided by demodulation logic 222. Portions of baseband system circuitry 210 that further process the decoded data 226 provided by channel decoding logic 224 are not shown for purposes of clarity but are well understood by one of ordinary skill in the art.

Various modulation and waveform synthesis schemes may be used. For example, modulation logic 216 and demodulation logic 222 may be configured in accordance with quadrature amplitude modulation (QAM). As well understood by one of ordinary skill in the art, QAM independently modulates each sub-carrier or tone with (encoded) baseband data. Waveform synthesis logic 218 and waveform analysis logic 220 may be configured in accordance with, for example, OFDM. As well understood by one of ordinary skill in the art, OFDM generates multiple orthogonally spaced sub-carrier signals or tones corresponding to multiple information channels.

Figure 3:
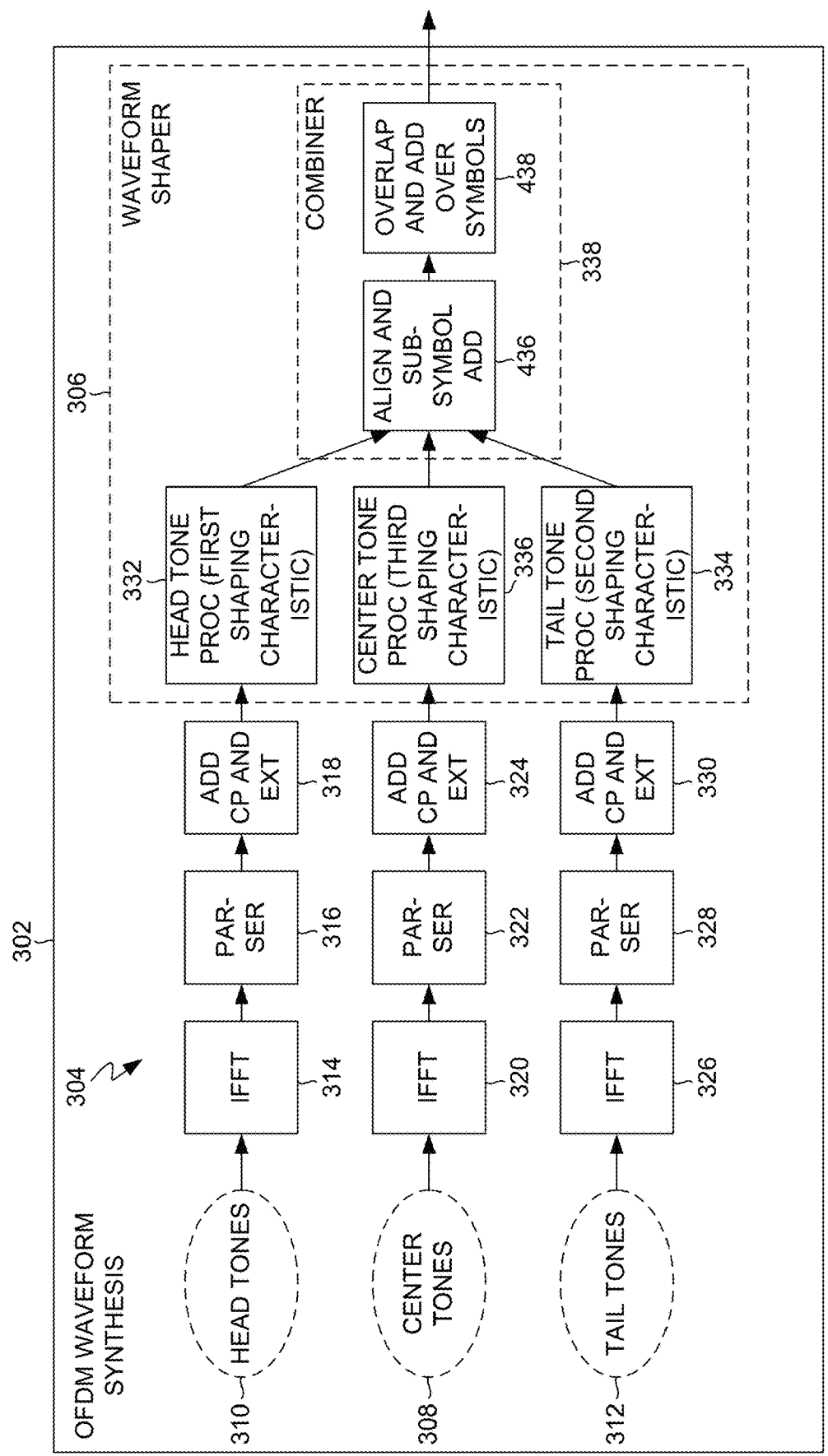
FIG. 3 is a block diagram of an example of a waveform synthesis portion of a transceiver device or user equipment, in accordance with various aspects of the present disclosure.

FIG. 3 is a block diagram of OFDM waveform synthesis logic 302, in accordance with various aspects of the present disclosure. The OFDM waveform synthesis logic 302 may be an example of one or more aspects of waveform synthesis logic 218 described above with reference to FIG. 2. The OFDM waveform synthesis logic 302 may include a transform section 304 and a waveform shaper 306. Transform section 304 may operate upon center tones 308, head tones 310, and tail tones 312. Center tones 308 comprise a group or range of multiple sub-carriers or tones that lie between head tones 310 (i.e., another group or range of multiple sub-carriers or tones lower than center tones 308 in frequency), and tail tones 312 (i.e., still another group or range of multiple sub-carriers or tones higher than center tones 308 in frequency).

Transform section 304 includes IFFT logic 314 that converts or transforms head tones 310 from the frequency domain to the time domain. Transform section 304 not only performs such a transform but also may perform ancillary functions. For example, transform section 304 may also include a parallel-to-serial converter 316 that converts the output signals provided by IFFT logic from a parallel format to a serial format. Transform section 304 may also include, for example, extension logic 318 that adds a cyclic prefix (CP) and an extension (EXT) to the serial output signals provided by parallel-to-serial converter 316. As well understood by one of ordinary skill in the art, a cyclic prefix is a part of the symbol (or sub-symbol in the case of separate processing paths for center tones 308, head tones 310, and tail tones 312) that is copied from one end of the symbol and appended to the other end. This process of adding a cyclic prefix helps to reduce inter-symbol interference (ISI). An additional extension may also be added for the overlap-and-add operation across successive symbols over time. Transform section 304 may similarly include another path comprising IFFT logic 320, a parallel-to-serial converter 322, and extension logic 324, which together process center tones 308. Transform section 304 may similarly include still another path comprising IFFT logic 326, a parallel-to-serial converter 328, and extension logic 330, which together process tail tones 312

Waveform shaper 306 may include a head tone processor 332 configured to process head tones 310 (as transformed by transform section 304) using a first waveform shaping characteristic, a tail tone processor 334 configured to process tail tones 312 (as transformed by transform section 304) using a second waveform shaping characteristic, and a center tone processor 336 configured to process center tones 308 (as transformed by transform section 304) using a third waveform shaping characteristic. Significantly, in this example, the first, second, and third waveform shaping characteristics may be different from each other or "asymmetric." The output of each of head tone processor 332, tail tone processor 334, and center tone processor 336 comprises a sequence or stream of sub-symbols. A combiner 338 is configured to combine a first sub-symbol provided by head tone processor 332, a second sub-symbol provided by center tone processor 334, and a third sub-symbol provided by tail tone processor 336 into an output symbol. As described below with regard to FIG. 4, in some examples combiner 338 may comprise an aligner and sub-symbol adder 436 and an overlapper and symbol adder 438. The output of combiner 338 may comprise a sequence or stream of symbols.

Figure 4:
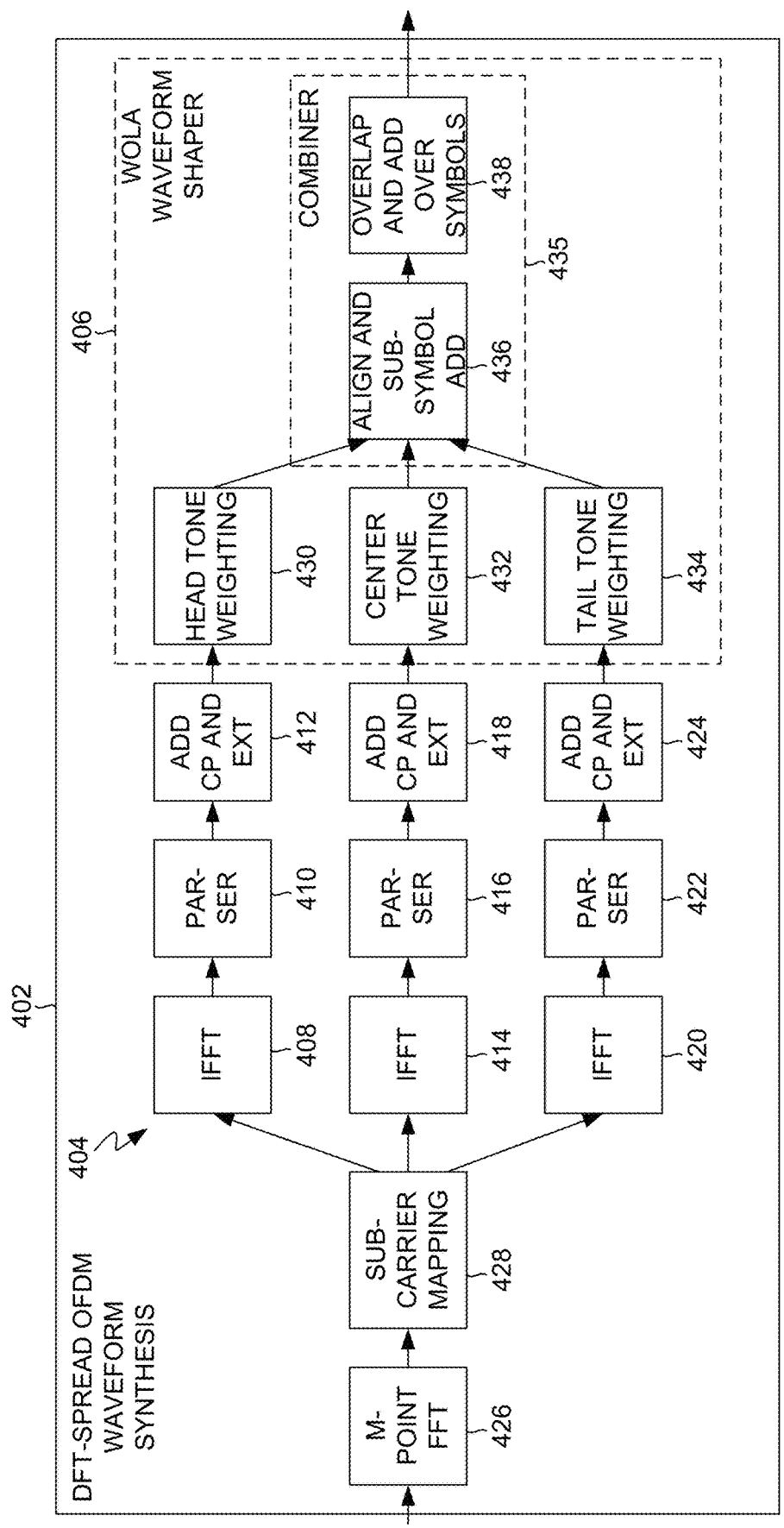
FIG. 4 is a block diagram of another example of a waveform synthesis portion of a transceiver device or user equipment, in accordance with various aspects of the present disclosure.

FIG. 4 is a block diagram of Discrete Fourier Transform-spread OFDM (DFT-s-OFDM) waveform synthesis logic 402, in accordance with various aspects of the present disclosure. The DFT-s-OFDM waveform synthesis logic 402 may be an example of one or more aspects of above-described OFDM waveform synthesis logic 302 (FIG. 3) or 218 (FIG. 2). The DFT-s-OFDM waveform synthesis logic 402 may include a transform section 404 and a WOLA waveform shaper 406. As transform section 404 may be similar to above-described transform section 304 (FIG. 3), transform section 404 may include IFFT logic 408, a parallel-to-serial converter 410, and extension logic 412, which together process head tones, IFFT logic 414, a parallel-to-serial converter 416, and extension logic 418, which together process center tones, and IFFT logic 420, a parallel-to-serial converter 422, and extension logic 424, which together process tail tones.

FIG. 4 also illustrates that in accordance with DFT-spread OFDM principles, the source of the head tones, center tones, and tail tones may comprise, for example, FFT logic 426 and a sub-carrier mapper 428. A serial-to-parallel conversion operation may also occur between the input of FFT logic 426 and the output of a modulator, such as modulation logic 216 (FIG. 2), but is not shown for purposes of clarity. The FFT logic 426 may perform an M-point FFT on a time-domain symbol block, where M is the total number of discrete tones (i.e., head tones, center tones, and tail tones). Sub-carrier mapper 428 then allocates or maps the tones provides by FFT logic 428 to the total set of sub-carriers.

The WOLA waveform shaper 406 processes head tones by applying head tone weighting function 430, processes center tones by applying center tone weighting function 432, and processes tail tones by applying tail tone weighting function 434. Head tone weighting function 430, center tone weighting function 432, and tail tone weighting function 434 may be different from each other. A combiner 435 may combine the weighted sub-symbols provided by head tone weighting function 430, center tone weighting function 432, and tail tone weighting function 434. Combiner 435 may include an aligner and sub-symbol adder 436 configured to align (in the time domain) a weighted head tone sub-symbol provided by head tone weighting function 430, a weighted center tone sub-symbol provided by center tone weighting function 432, and a weighted tail tone sub-symbol provided by tail tone weighting function 434 and add or sum them to form a symbol. Combiner 435 may further includes an overlapper and symbol adder 438 configured to overlap and add two successive symbols.

Figure 5:
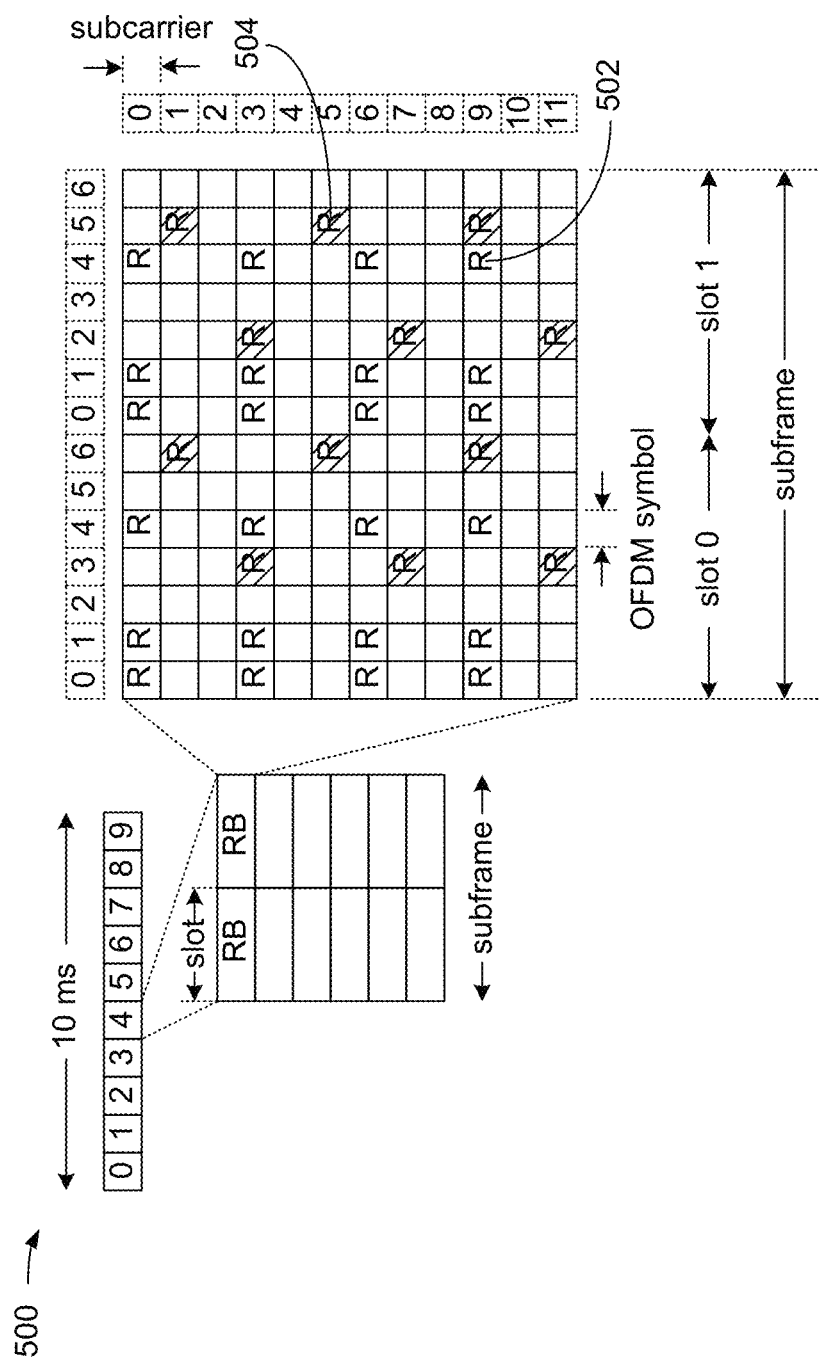
FIG. 5 is a diagram illustrating an example of a DL frame structure in LTE, in accordance with various aspects of the present disclosure.

FIG. 5 is a diagram 500 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 502, 504, include DL reference signals (DL-RS). The DL-RS include Cell-specific RS (CRS) (also sometimes called common RS) 502 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 6:
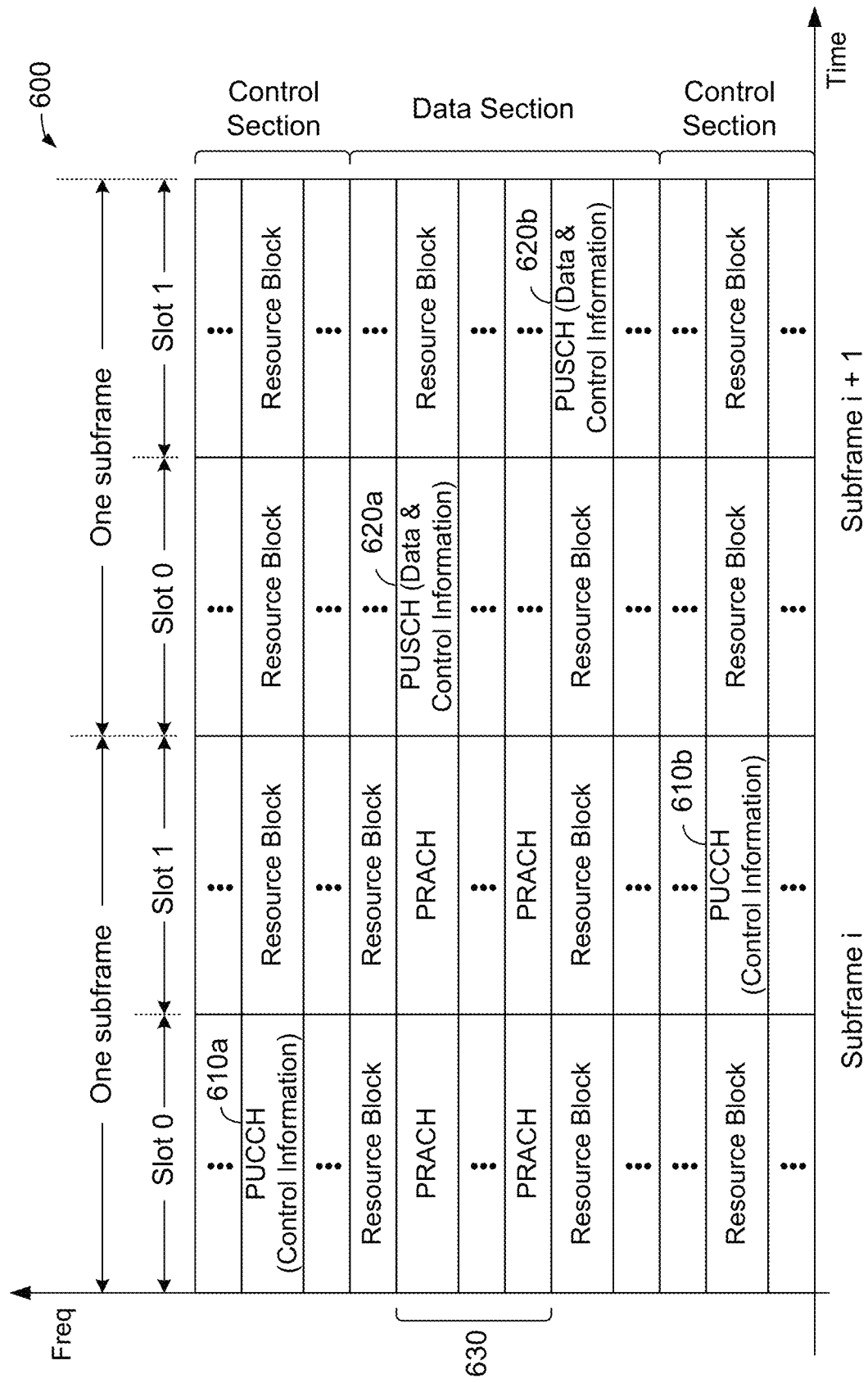
FIG. 6 is a diagram illustrating an example of an UL frame structure in LTE, in accordance with various aspects of the present disclosure.

FIG. 6 is a diagram 600 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 610a, 610b in the control section to transmit control information to an eNB/gNB. The UE may also be assigned resource blocks 620a, 620b in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 630. The PRACH 630 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 7A:
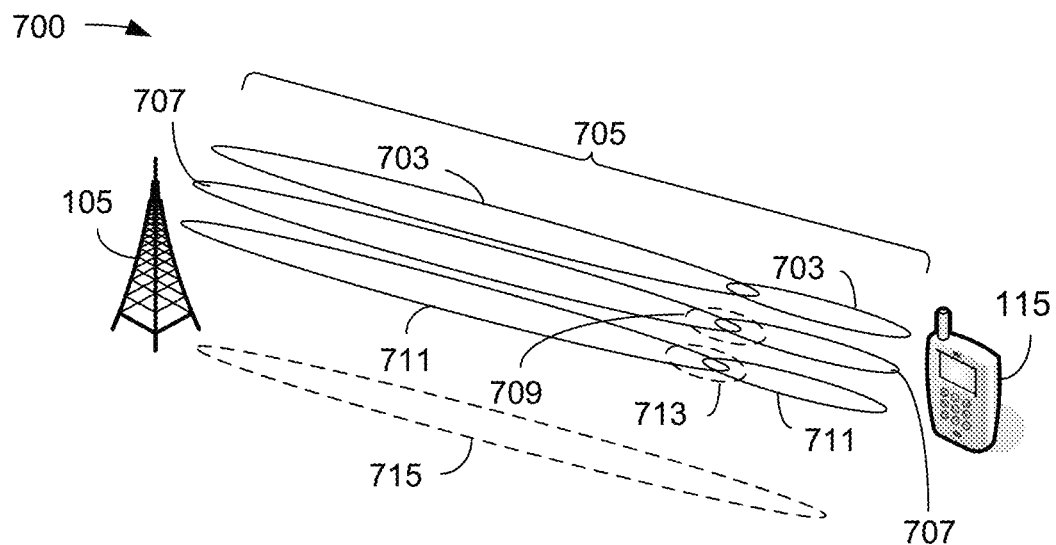
FIG. 7A is a block diagram of a communication system including a base station and a UE for use in wireless communication, in accordance with various aspects of the present disclosure.

FIG. 7A is a block diagram 700 of a communication system including a base station 105 and a UE 115 for use in wireless communication, in accordance with various aspects of the present disclosure. The base station 105 may be an example of one or more aspects of a base station described with reference to FIG. 1. The UE 115 may be an example of one or more aspects of a UE described with reference to FIG. 1.

The UE 115 may be in bi-directional wireless communication with the base station 105. In an exemplary embodiment, the UE 115 may be in bi-directional wireless communication with the base station 105 over a serving beam 703, which may also be referred to as a beam pair link (BPL) 705. A serving beam may be a communication beam that conveys control information, referred to as a control beam, may be a communication beam that conveys data, referred to as a data beam, or may be other communication beams. In an exemplary embodiment, the serving beam 703 may comprise a transmit beam sent from the base station 105 and a receive beam tuned to by the UE 115, and may comprise a transmit beam sent by the UE 115 and a receive beam tuned to by the base station 105. The BPL 705 is intended to depict bi-directional communication between the UE 115 and the base station 105 using a combination of transmit and receive beams that cooperate to create the bi-directional communication link. In an exemplary embodiment, the serving beam 703 may be one of a plurality of directional communication beams that may be configured to operatively couple the UE 115 to the base station 105. In an exemplary embodiment, at a given time, the serving beam 703, and BPL 705, may be able to provide the most robust communication link between the UE 115 and the base station 105.

In an exemplary embodiment, other serving beams may also be established between a UE 115 and the base station 105. For example, serving beams 707 may establish a BPL 709 between the UE 115 and the base station 105; and serving beam 711 may establish a BPL 713 between the UE 115 and the base station 105.

In an exemplary embodiment, one or more target or candidate beams may also be available to provide a communication link between the UE 115 and the base station 105. In an exemplary embodiment, the candidate beam 715 represents one of a plurality of available candidate beams, and is shown in dotted line to indicate that it is not actively providing an operative communication link between the UE 115 and the base station 105.

Figure 7B:
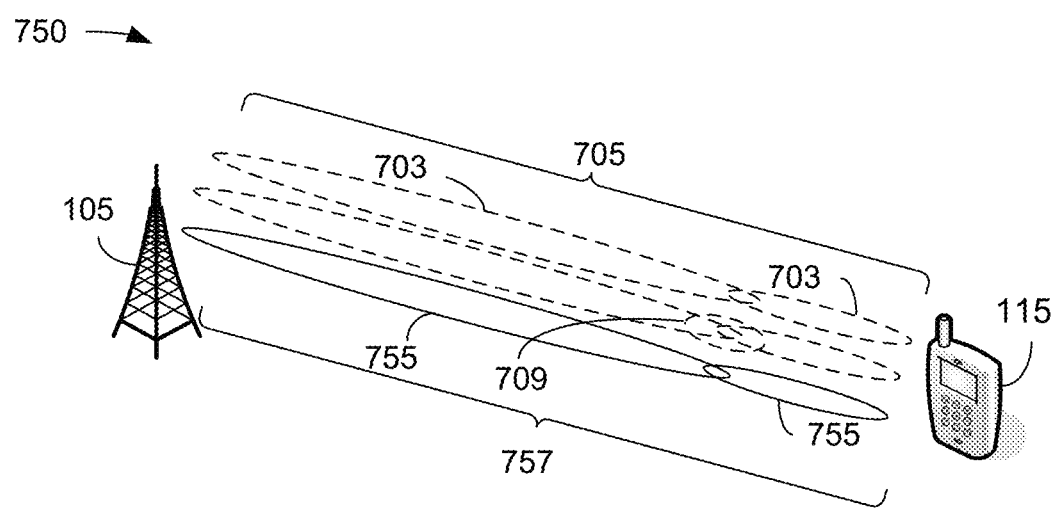
FIG. 7B is a block diagram of a communication system including a base station and a UE for use in wireless communication, in accordance with various aspects of the present disclosure.

FIG. 7B is a block diagram 750 of a communication system including a base station 105 and a UE 115 for use in wireless communication, in accordance with various aspects of the present disclosure. FIG. 7B illustrates transition from a serving beam to a candidate beam. For example, in FIG. 7B, the BPL 705 and/or the BPL 709 have experienced radio link failure (RLF), or may soon experience RLF, in that they are unable to continue to establish, or maintain a radio communication link between the UE 115 and the base station 105. However, a candidate, or target, beam 755 and the BPL 757, may be available for communication.

The example shown in FIG. 7B shows an exemplary embodiment of communication beam transition. For example, the UE 115 may generate and periodically transmit to the base station 105 beam information including, for example, a beam index (BI) report listing information relating to the serving beam 703 and one or more available target beams 755 of which the UE 115 may be aware. In an exemplary embodiment, the BI report may include the identity of one or more candidate beams, such as candidate beam 755 of which the UE 115 may be aware, and which may be available to provide a communication link between the base station 105 and the UE 115 should the quality of the serving beam 703 degrade to a point at which radio link failure (RLF) may be imminent.

Figure 8:
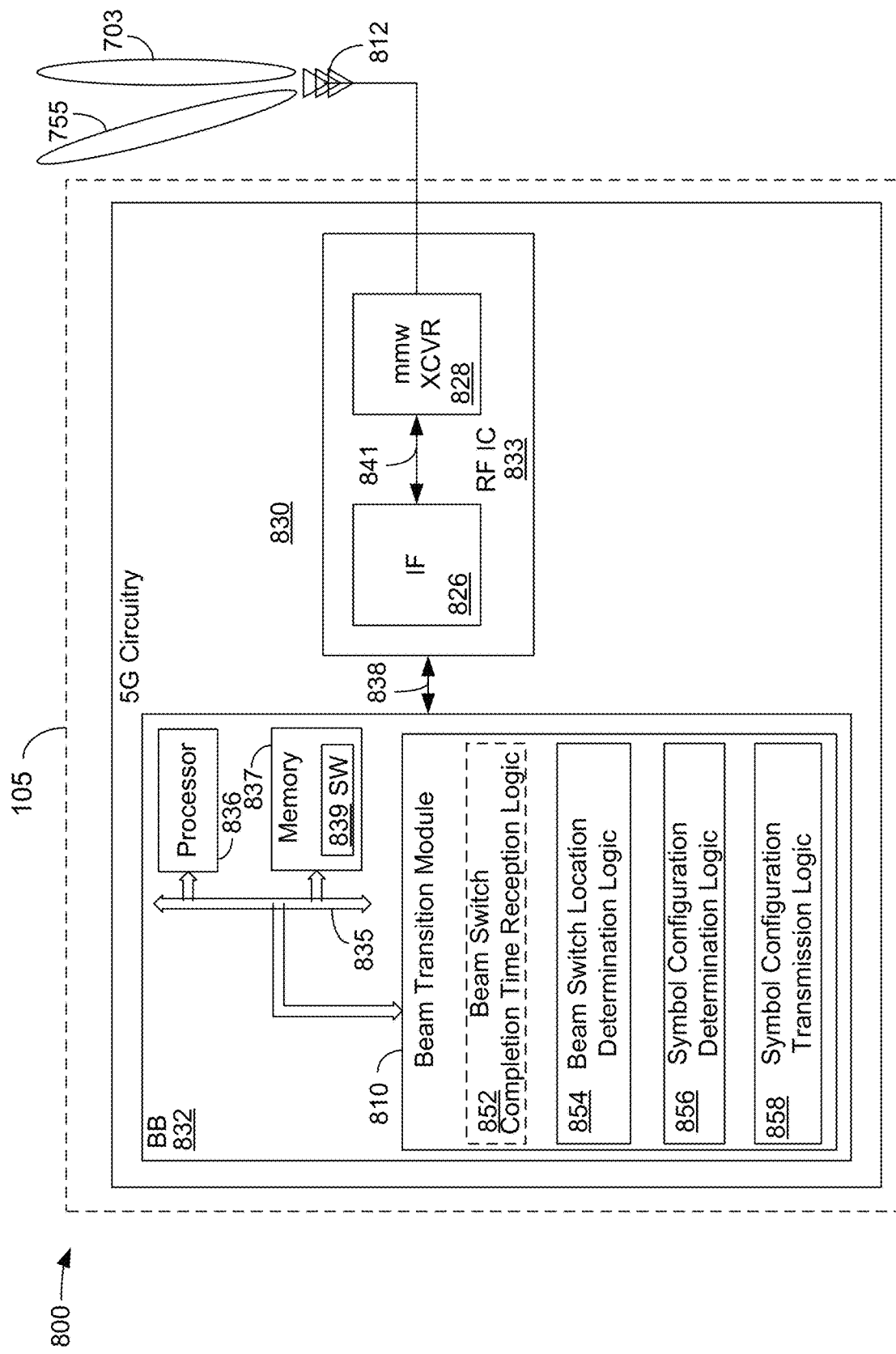
FIG. 8 shows a system for use in wireless communication, in accordance with various aspects of the present disclosure.

FIG. 8 shows a system 800 for use in wireless communication, in accordance with various aspects of the present disclosure. The system 800 may include a base station 105, which may be an example of the base station 105 of FIG. 1. The base station 105 may comprise 5G circuitry 830, and other communication circuitry (not shown). Some of the operational elements of the 5G circuitry 830 may be omitted for ease of description, and are known to those having ordinary skill in the art.

The base station 105 may generally include components for bi-directional voice and data communications including components for transmitting communications and components for receiving communications. The base station 105 may include an antenna 812 coupled to the 5G circuitry 830. The antenna 812 may comprise one or more antenna elements, may comprise an array, or a phased array, of antenna elements, and may comprise one or more directional and/or omni-directional antenna elements, which may be controlled individually or in groups of two or more elements. The 5G circuitry 830 may be configured to establish a 5G communication channel with a device, such as a UE 115 (not shown). In an exemplary embodiment, the communication channel may comprise the serving beam 703 and one or more target beams 755.

The 5G circuitry 830 may comprise a baseband system 832 and a radio frequency integrated circuit (RFIC) 833, operatively coupled together over a bi-directional connection 838. The baseband system 832 may comprise a processor 836, a memory 837 (including software (SW) 839), and a beam transition module 810, which may communicate, directly or indirectly, with each other (e.g., via one or more buses 835). The RFIC 833 may comprise an intermediate frequency (IF) sub-system 826 and a transceiver module 828 operatively coupled together over a bi-directional connection 841. The RFIC 833 may comprise one or more digital components and one or more analog components, such as, for example, phase shifters, switches, or other components configured for beamforming. In an exemplary embodiment, the transceiver module 828 may be configured to communicate over millimeter wave (mmW) frequencies. The transceiver module 828 may communicate bi-directionally, via the antenna(s) 812 and/or one or more wired or wireless links, with one or more networks, as described above. For example, the transceiver module 828 may communicate bi-directionally with UEs 115 (not shown). One or more of the analog components in the transceiver module 828 may be used when transitioning from one communication beam to another communication beam. In an exemplary embodiment, the "beam switch time" or "beam transition time" refers to a delay between the triggering of the transition from a serving communication beam to a target communication beam to the final settling time on the target communication beam, and typically may take hundreds of nanoseconds (ns). Such hundreds of ns delay time can be significant as mmW communication uses variable and sometimes wider sub-carrier frequency spacing than does LTE, which allows less time for the CP in a mmW communication system compared with LTE.

The transceiver module 828 may include a modem to modulate the packets and provide the modulated packets to the antenna(s) 812 for transmission, and to demodulate packets received from the antenna(s) 812. While the base station 105 may include a single antenna 812 the base station 105 may have multiple antennas capable of concurrently transmitting and/or receiving multiple wireless transmissions via carrier aggregation techniques, for example. The transceiver module 828 may be capable of concurrently communicating with one or more UEs 115 via multiple component carriers.

The base station 105 may include a beam transition module 810, which may perform the beam transition functions described herein. In an exemplary embodiment, the beam transition module 810 may be configured to cooperate with the processor 836 and the memory 837 to allow the base station 105 to communicate with a UE 115 to transition from a serving beam 703 to a target beam 755 as described herein.

In an exemplary embodiment, the beam transition module 810 may comprise an optional beam switch completion time reception logic 852 configured to process a beam transition completion time communication from another communication device, such as from a UE 115. In an exemplary embodiment, the beam transition module 810 may also comprise a beam switch location determination logic 854, a symbol configuration determination logic 856 and a symbol configuration transmission logic 858.

In an exemplary embodiment, the beam switch location determination logic 854 may be configured to identify a location in time in a communication transmission time interval (TTI) where a communication beam transition will occur.

In an exemplary embodiment, the symbol configuration determination logic 856 may be configured to determine a configuration of a communication symbol at least partly based on the identified beam transition location and a priority of the communication symbol, where in the configuration an extended guard period is created by changing the sub-carrier frequency spacing of at least one of the communication symbols following and/or preceding the beam transition location.

In an exemplary embodiment, symbol configuration transmission logic 858 may be configured to send the configuration of the communication symbol in a signaling communication to a second communication device.

Although shown as a separate logic elements in FIG. 8, the instructions associated with the logic elements in the beam transition module 810 may be partly or wholly stored in the memory 837 for execution by the processor 836. The logic elements in the beam transition module 810 may be software, firmware, or a combination of software and firmware that can be configured and executed by the processor 836 to perform the functions described herein.

The memory 837 may include random access memory (RAM) and read-only memory (ROM). The memory 837 may store computer-readable, computer-executable software/firmware code 839 containing instructions that, when executed, cause the processor 836 to perform various functions described herein (e.g., perform synchronization operations, synchronize reference timing parameters, beam transition operations, etc.). Alternatively, the computer-readable, computer-executable software/firmware code 839 may not be directly executable by the processor 836 but cause a computer (e.g., when compiled and executed) to perform functions described herein. The processor 836 may include an intelligent hardware device, e.g., a central processing unit (CPU), a microcontroller, an application-specific integrated circuit (ASIC), etc.

Although the logic elements associated with the beam transition module 810 are described in FIG. 8 in a conceptual manner as stored in or residing in the memory 837, persons skilled in the art understand that such logic elements arise through the operation of the processor 836 in accordance with conventional computing device principles. That is, software, firmware, or a combination of software and firmware contributes to programming or configuring the processing system to be characterized by such logic elements. Although the memory 837 is depicted in FIG. 8 as a single or unitary element for purposes of clarity, the memory 837 can be of any suitable type and can have any suitable structure, such as one or more modules, chips, etc. Likewise, although the processor 836 is depicted in FIG. 8 as a single or unitary element for purposes of clarity, the processor 836 can be of any suitable type and can have any suitable structure, such as one or more modules, chips, etc. For example, the processor 836 can comprise one or more microprocessors or microcontrollers. Some or all of the foregoing processing system elements can be provided in, for example, an application-specific integrated circuit (ASIC) or other integrated digital device. It should be understood that the combination of the memory 837 and the above-referenced modules or software, firmware, instructions, etc., underlying the logic elements, as stored in the memory 837 in non-transitory computer-readable form, defines a "computer program product" as that term is understood in the patent lexicon. In view of the descriptions herein, persons skilled in the art will readily be capable of providing suitable software or firmware or otherwise configuring the base station 105 to operate in the manner described. Also, although the effect of each of the above-referenced logic elements is described herein, it should be understood that the effect may result from contributions of two or more logic elements in concert, or from contributions of the logic elements and conventional switch logic elements or other software, hardware, or network elements that are not shown for purposes of clarity.

Figure 9:
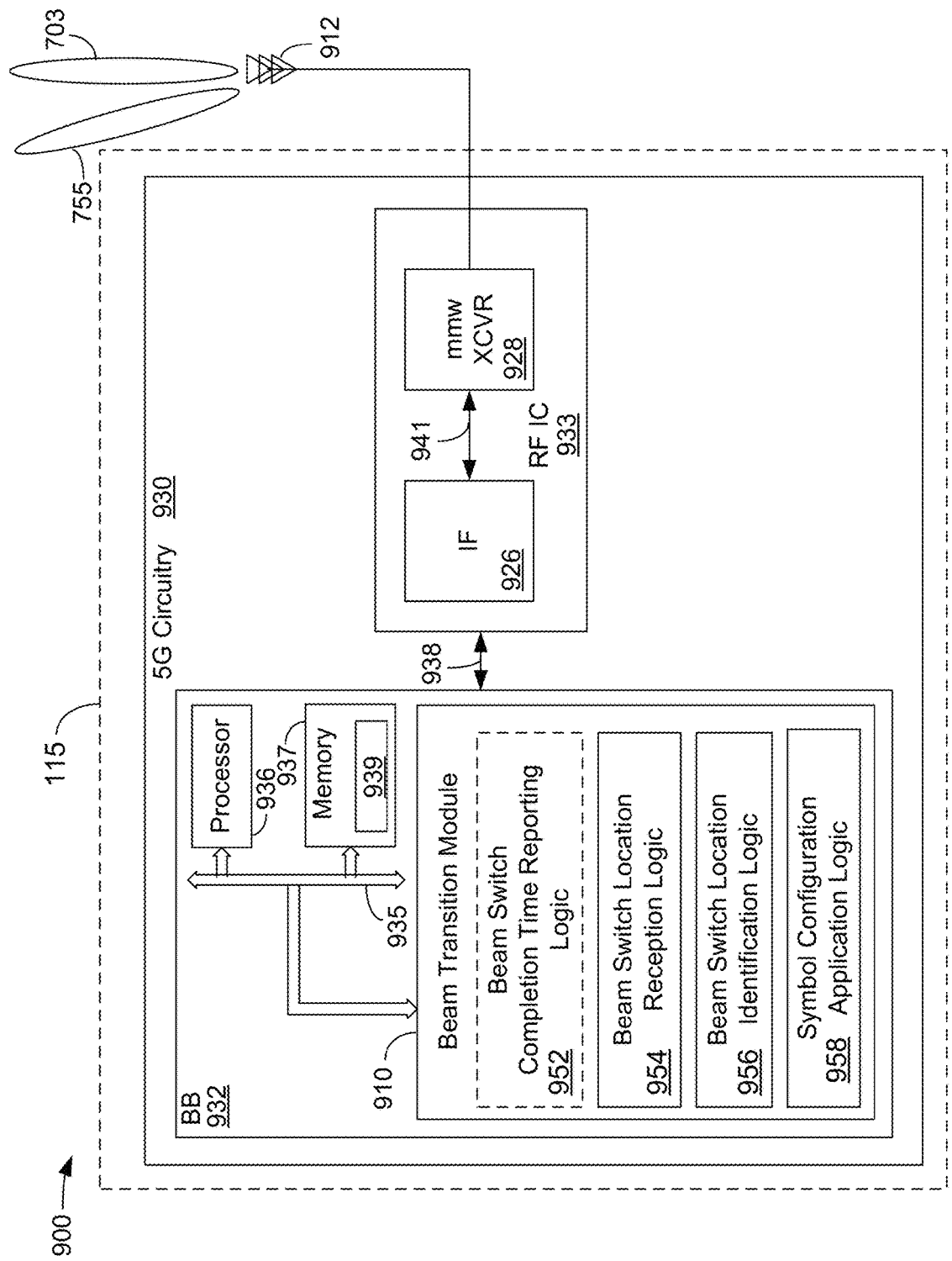
FIG. 9 shows a system for use in wireless communication, in accordance with various aspects of the present disclosure.

FIG. 9 shows a system 900 for use in wireless communication, in accordance with various aspects of the present disclosure. The system 900 may include a UE 115, which may be an example of the UE 115 of FIG. 1. The UE 115 may comprise 5G circuitry 930 and other communication circuitry (not shown). Some of the operational elements of the 5G circuitry 930 may be omitted for ease of description, and are known to those having ordinary skill in the art.

The UE 115 may generally include components for bi-directional voice and data communications including components for transmitting communications and components for receiving communications. The UE 115 may include an antenna 912 coupled to the 5G circuitry 930. The antenna 912 may comprise one or more antenna elements, may comprise an array, or a phased array, of antenna elements, and may comprise one or more directional and/or omni-directional antenna elements, which may be controlled individually or in groups of two or more elements. The 5G circuitry 930 may be configured to establish a 5G communication channel with a base station 105 (not shown). In an exemplary embodiment, the communication channel may comprise the serving beam 703 and one or more target beams 755.

The 5G circuitry 930 may comprise a baseband system 932 and a radio frequency integrated circuit (RFIC) 933 operatively coupled together over a bi-directional connection 938. The baseband system 932 may comprise a processor 936, a memory 937 (including software (SW) 939), and a beam transition module 910, which each may communicate, directly or indirectly, with each other (e.g., via one or more buses 935). The RFIC 933 may comprise an intermediate frequency (IF) sub-system 926 and a transceiver module 928 operatively coupled together over a bi-directional connection 941. The RFIC 933 may comprise one or more digital components and one or more analog components, such as, for example, phase shifters, switches, or other components configured for beamforming. One or more of the analog components in the transceiver module 928 may be used when transitioning from one communication beam to another communication beam. In an exemplary embodiment, the "beam switch time" or "beam transition time" refers to a delay from triggering the change of beams to the final settling time, and typically may take hundreds of nanoseconds (ns). Such hundreds of ns delay time can be significant as mmW uses variable and sometimes wider tone spacing than does LTE, which allows less time for the CP in a mmW communication system compared with LTE, as mentioned above.

In an exemplary embodiment, the transceiver module 928 may be configured to communicate over millimeter wave (mmW) frequencies. The transceiver module 928 may communicate bi-directionally, via the antenna(s) 912 and/or one or more wired or wireless links, with one or more networks, as described above. For example, the transceiver module 928 may communicate bi-directionally with base stations 105 (not shown), with other UEs 115, and/or with devices 115. The transceiver module 928 may include a modem to modulate the packets and provide the modulated packets to the antenna(s) 912 for transmission, and to demodulate packets received from the antenna(s) 912. While the UE 115 may include a single antenna 912 for the 5G circuitry 530, the UE 115 may have multiple antennas capable of concurrently transmitting and/or receiving multiple wireless transmissions via carrier aggregation techniques, for example. The transceiver module 928 may be capable of concurrently communicating with one or more base stations 105 via multiple component carriers.

The UE 115 may include a beam transition module 910, which may perform the beam transition functions described herein. In an exemplary embodiment, the beam transition module 910 may be configured to communicate with a base station 105 to transition from a serving beam 703 to a target beam 755 as described herein.

In an exemplary embodiment, the beam transition module 910 may comprise an optional beam switch completion time reporting logic 952 configured to generate and report a communication beam transition completion time capability to another communication device, such as to a base station (gNB). In an exemplary embodiment, the beam transition module 910 may also comprise a beam switch location reception logic 954, a beam switch location identification logic 956 and a symbol configuration application logic 958.

In an exemplary embodiment, the optional beam switch completion time reporting logic 952 may be configured to generate and report a communication beam transition completion time capability to another communication device, such as to a base station (gNB).

In an exemplary embodiment, the beam switch location reception logic 954 may be configured to process a signaling indicating one or more of a beam transition location and/or a communication configuration for a transmission time interval (TTI).

In an exemplary embodiment, the beam switch location identification logic 956 may be configured to identify the beam transition location at least in part based on the received signal in the TI.

In an exemplary embodiment, the symbol configuration application logic 958 may be configured to determine a configuration of a communication symbol at least partly based on the received signaling and/or a predefined method, where in the configuration an extended guard period may be created for a symbol by changing the sub-carrier frequency spacing of at least one of the symbols following and/or preceding the identified beam transition location, so that the sub-carrier frequency spacing for the symbol immediately following and/or preceding the beam transition location is different than the sub-carrier frequency spacing for a symbol that does not immediately precede and/or follow the beam transition location. In an exemplary embodiment, the communication configuration may be at least partly determined by the capability reported by the optional beam switch completion time reporting logic 952. As used herein, the term "predefined method" may comprise, for example, a procedure that may be defined in a communication standard, for example, the 3GPP standard, which both a UE and a base station may be configured to perform. For example, a predefined method in a communication standard may define that in an implementation having an extended CP length, no adjustment of sub-carrier frequency spacing is performed, while in an implementation having a normal CP length, the sub-carrier frequency spacing may be adjusted. For example, the sub-carrier frequency spacing may be adjusted if the modulation and coding scheme for the PDSCH communication following the beam switch time is larger than a threshold, and/or if the sub-carrier frequency spacing is above a threshold, e.g., 120 KHz. In such an example, without further signaling, both a base station and a UE may determine whether to adjust the sub-carrier frequency spacing based on such a predefined method in the standard.

Although shown as a separate logic elements in FIG. 9, the instructions associated with the elements in the beam transition module 910 may be partly or wholly stored in the memory 937 for execution by the processor 936.

The logic elements in the beam transition module 910 may be software, firmware, or a combination of software and firmware that can be configured and executed by the processor 936 to perform the functions described herein.

The memory 937 may include random access memory (RAM) and read-only memory (ROM). The memory 937 may store computer-readable, computer-executable software/firmware code 939 containing instructions that, when executed, cause the processor 936 to perform various functions described herein (e.g., perform synchronization operations, synchronize reference timing parameters, beam transition operations, etc.). Alternatively, the computer-readable, computer-executable software/firmware code 939 may not be directly executable by the processor 936 but cause a computer (e.g., when compiled and executed) to perform functions described herein. The processor 936 may include an intelligent hardware device, e.g., a central processing unit (CPU), a microcontroller, an application-specific integrated circuit (ASIC), etc.

Although the logic elements associated with the beam transition module 910 are described in FIG. 9 in a conceptual manner as stored in or residing in the memory 937, persons skilled in the art understand that such logic elements arise through the operation of the processor 936 in accordance with conventional computing device principles. That is, software, firmware, or a combination of software and firmware contributes to programming or configuring the processing system to be characterized by such logic elements. Although the memory 937 is depicted in FIG. 9 as a single or unitary element for purposes of clarity, the memory 937 can be of any suitable type and can have any suitable structure, such as one or more modules, chips, etc. Likewise, although the processor 936 is depicted in FIG. 9 as a single or unitary element for purposes of clarity, the processor 936 can be of any suitable type and can have any suitable structure, such as one or more modules, chips, etc. For example, the processor 936 can comprise one or more microprocessors or microcontrollers. Some or all of the foregoing processing system elements can be provided in, for example, an application-specific integrated circuit (ASIC) or other integrated digital device. It should be understood that the combination of the memory 937 and the above-referenced modules or software, firmware, instructions, etc., underlying the logic elements, as stored in the memory 937 in non-transitory computer-readable form, defines a "computer program product" as that term is understood in the patent lexicon. In view of the descriptions herein, persons skilled in the art will readily be capable of providing suitable software or firmware or otherwise configuring the UE 115 to operate in the manner described. Also, although the effect of each of the above-referenced logic elements is described herein, it should be understood that the effect may result from contributions of two or more logic elements in concert, or from contributions of the logic elements and conventional switch logic elements or other software, hardware, or network elements that are not shown for purposes of clarity.

Figure 10A:
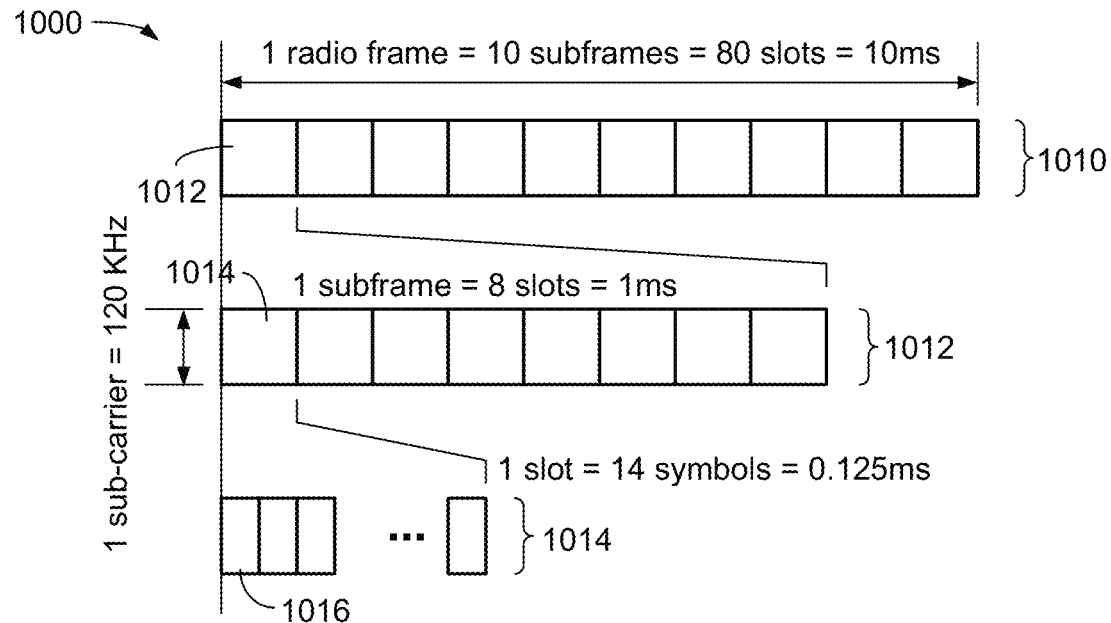
FIG. 10A is a diagram showing a 5G communication frame structure with 120 KHz sub-carrier spacing.

FIG. 10A is a diagram showing a 5G communication frame structure 1000 with 120 KHz sub-carrier spacing. A 5G radio frame may support variable sub-carrier spacing. For example, a 5G radio frame may have sub-carrier spacing of 15 KHz, 30 KHz, 60 KHz, 120 KHz and 240 KHz. The sub-carrier spacing is related to symbol length and the term "numerology" as used herein refers to the sub-carrier spacing and symbol length of a communication symbol. The frame structure 1000 shows a 120 KHz sub-carrier spacing and shows one (1) radio frame 1010 having ten (10) sub-frames 1012, which equates to 80 slots and a time duration of 10 milliseconds (ms). Each subframe 1012 may comprise 8 slots 1014 and have a duration of 1 ms. Each slot 1014 may comprise 14 communication symbols 1016, with each symbol having a duration of 0.125 ms.

Figure 10B:
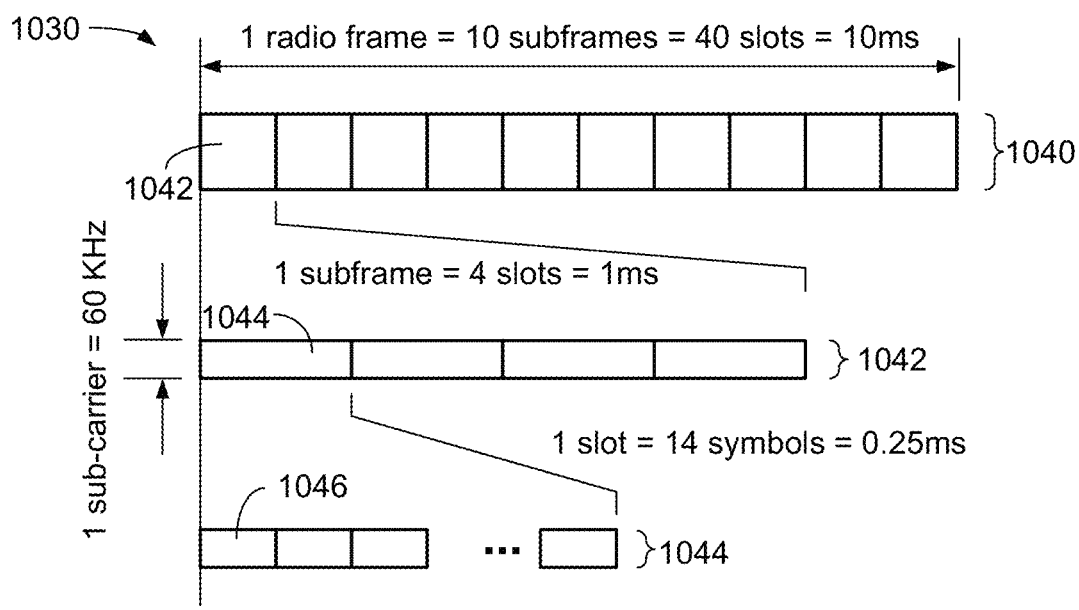
FIG. 10B is a diagram showing a 5G communication frame structure with 60 KHz sub-carrier spacing.

FIG. 10B is a diagram showing a 5G communication frame structure 1030 with 60 KHz sub-carrier spacing. The frame structure 1030 shows a 60 KHz sub-carrier spacing and shows one (1) radio frame 1040 having ten (10) sub-frames 1042, which equates to 40 slots and a time duration of 10 milliseconds (ms). Each subframe 1042 may comprise 4 slots 1044 and have a duration of 1 ms. Each slot 1044 may comprise 14 communication symbols 1046, with each symbol having a duration of 0.25 ms. As the sub-carrier spacing is reduced, the time duration of each symbol is lengthened. As shown above, the time duration of a communication symbol 1016 at 120 KHz sub-carrier spacing is 0.125 ms and the time duration of a communication symbol 1046 at 60 KHz sub-carrier spacing is 0.25 ms. Other sub-carrier spacing leads to other communication symbol lengths.

Figure 11:
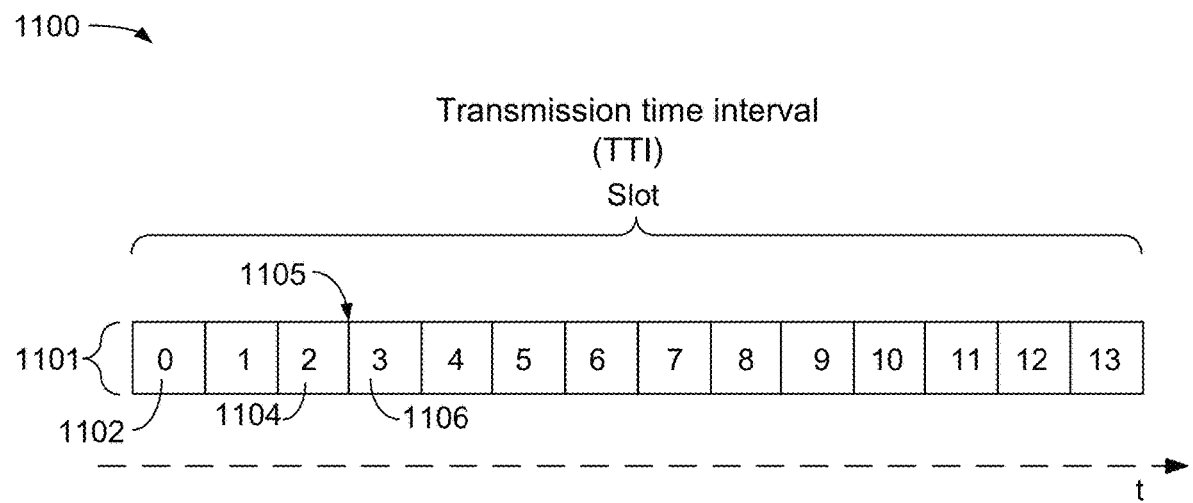
FIG. 11 shows a communication slot in accordance with various aspects of the present disclosure.

FIG. 11 shows an exemplary communication slot 1100 in accordance with various aspects of the present disclosure. The communication slot 1100 may occur within a transmission time interval (TTI), and may occupy an entire TTI, or may occupy less than one TTI, or alternatively, a TTI may have a duration that is less than a duration of the slot 1100.

The communication slot 1100 comprises a number of communication symbols 1102, labeled symbols 0 through 13 in this example, in am exemplary sub-carrier 1101. In an exemplary embodiment of the disclosure, a communication beam switch may occur, or be scheduled to occur at any point during the communication slot 1100. A beam switch or a beam transition may comprise a change in the transmission configuration indicator (TCI) of the transmission. In this example, a communication beam transition is set to occur at a time point 1105 between the third symbol (symbol 2) 1104 and the fourth symbol (symbol 3) 1106. The beam switch location 1105 refers to the point in time where communication of the third symbol 1104 and communication of the fourth symbol 1106 will occur on different communication beams. In alternative exemplary embodiments, the beam switch location may occur at points other than a boundary between communication symbols, and may occur anywhere within the communication slot 1100.

In accordance with an exemplary embodiment of the disclosure, one or more parameters, aspects, or features of the configuration of the symbol or symbols preceding or following the beam switch location 1105, that is the third symbol 1105 and/or the fourth symbol 1106, may be examined and at least partly used to determine the sub-carrier frequency spacing for the symbol or symbols preceding and/or following the beam switch location 1105. In an exemplary embodiment, the determination of whether to adjust the sub-carrier frequency spacing for a symbol may be made prior to the transmission. For example, one or more communication parameters may be configured soon after a UE is accessed into a communication network at which time the UE can identify such parameters and determine whether to adjust sub-carrier frequency spacing before any subsequent transmission. Other parameters can be dynamically configured, e.g. by an RRC communication or a downlink control information (DCI) communication; however, the configuration is completed and the UE is notified of the configuration prior to the transmission.

In accordance with an exemplary embodiment of the disclosure, in the example where the beam switch location 1105 is at the boundary between the third symbol 1104 and the fourth symbol 1106, one or more parameters, aspects, or features of the configuration of the third symbol 1104 and/or the fourth symbol 1106, may be examined and at least partly used to determine the sub-carrier spacing used to transmit the third symbol 1104 and/or the fourth symbol 1106. For example, the term "one or more parameters, aspects, or features of the configuration" of a communication symbol may refer to the contents, priority, or other features of the communication symbol. For example, a communication symbol carrying a demodulation reference signal (DMRS), channel state information-reference signal (CSI-RS), and a communication having a modulation and coding scheme (MCS) having a high reliability requirement may be considered a high priority symbol that may warrant altering (that is, reducing) the sub-carrier frequency spacing to create a symbol having a longer guard period at the beginning of the communication symbol for those selected symbols. Other examples of "one or more parameters, aspects, or features of the configuration" of a communication symbol can include the CP length of a symbol in the TTI, the channel delay estimation, and the capability of a communication device to complete a beam switch (e.g., the beam switch delay, which can be described as the duration of time that the beam switch will take to settle to a stable state on a target communication beam from the time at which the beam switch is initiated, also referred to as the triggering time). An example of this situation is when the CP length of a symbol occurring after the beam transition time is likely to be smaller than the sum of the length of the channel delay and the beam switch delay time. In such a situation, it may be beneficial to alter the sub-carrier frequency spacing of the symbol following the beam transition time to have a longer guard period to protect the payload from the possibility of ISI. Regarding the use of "one or more parameters, aspects, or features of the configuration" of a communication symbol occurring before the beam switch location 1105 (i.e., symbol 2, 1104 in the example of FIG. 11), an example of such may be if the symbol 1104 is of a lower priority (for example, a gap symbol) or if the symbol 1104 has a lower required EVM to decode (e.g., a PDCCH symbol which uses a lower modulation order and channel coding with lower coding rate), then the beam switch time may occur earlier than the beam switch location 1105, in order to further protect the high priority symbol 1106 from ISI. In this manner, instead of just adjusting the sub-carrier frequency spacing of the symbol 1106, additional guard period time may be provided for the symbol 1106 by making the beam transition time earlier than the time 1105.

Moreover, the point in time of the beam switch location can be flexible, and in alternative embodiments, can be based on the implementation of a base station and/or a UE. For example, if the third symbol 1104 is a gap symbol having no information, both the base station and the UE can transition from a serving beam to a target beam prior to the beam switch location 1105, to prepare for the fourth communication symbol 1106, which may be a high priority symbol. In other words, the beam switch may occur at a time other than the boundary between communication symbols in some instances.

As an example, the definition of the communication symbol "before" and the communication symbol "after" the beam switch location may be as follows. The communication symbol immediately before the beam switch location could be the last communication symbol having a first sample of payload (not including those samples that are part of the CP) that is sent before the beam switch location. The communication symbol immediately after the beam switch location could be the first communication symbol having a first sample of payload (not including those samples that are part of the CP) that is sent after the beam switch location. Therefore, the beam switch location may occur anywhere within a communication symbol.

Figure 12:
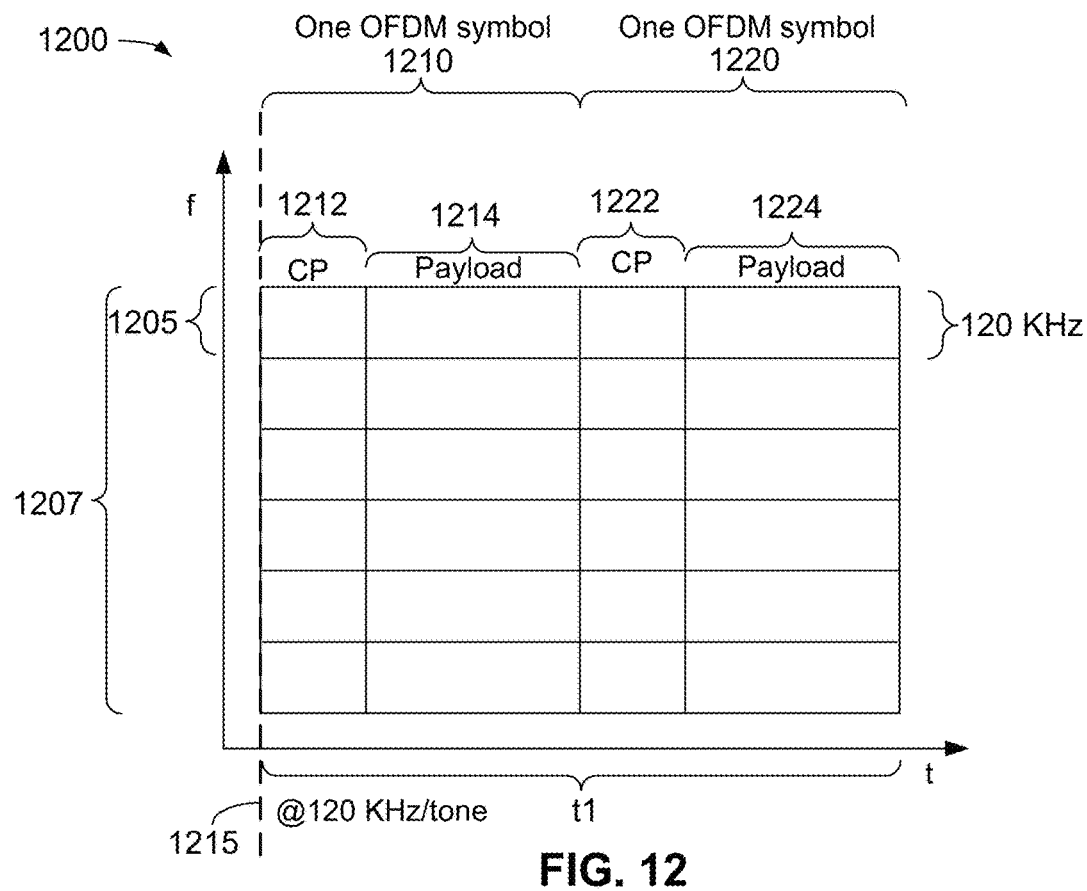
FIG. 12 is a diagram showing two communication symbols at a sub-carrier spacing of 120 KHz.

FIG. 12 is a diagram 1200 showing two communication symbols at a sub-carrier spacing of 120 KHz. The vertical axis represent frequency (f) and the horizontal axis represents time (t). The diagram 1200 shows a first communication symbol 1210 and a second communication symbol 1220. The first communication symbol 1210 includes a CP portion 1212 and a payload portion 1214. The first communication symbol 1210 comprises a number of different sub-carriers 1205 having a sub-carrier frequency spacing of 120 KHz, also called 120 KHz/tone, occupying a total frequency bandwidth 1207. The first communication symbol 1210 begins at a symbol boundary 1215 and extends in time to the right.

The second communication symbol 1220 includes a CP portion 1222 and a payload portion 1224. The second communication symbol 1220 also comprises a number of different sub-carriers 1205 having a sub-carrier frequency spacing of 120 KHz, also called 120 KHz/tone, and also occupies the total frequency bandwidth 1207.

Figure 13:
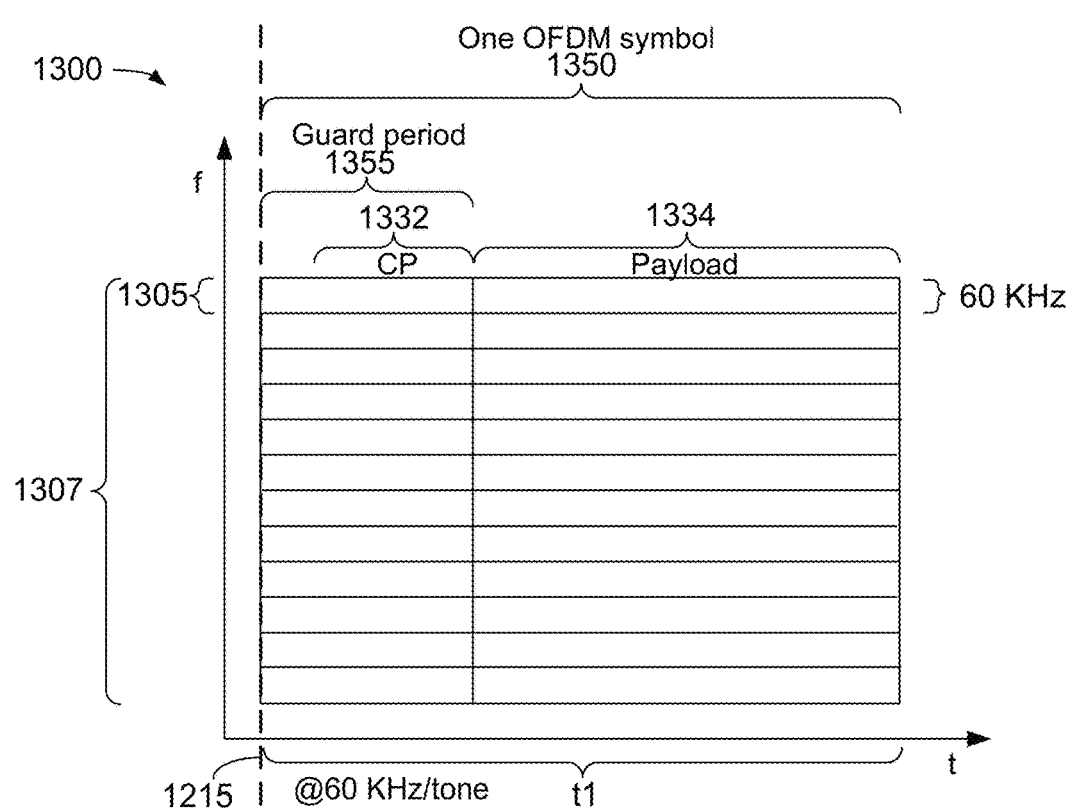
FIG. 13 is a diagram showing a communication symbol at a sub-carrier spacing of 60 KHz.

FIG. 13 is a diagram 1300 showing a communication symbol at a sub-carrier frequency spacing of 60 KHz. The vertical axis represent frequency (f) and the horizontal axis represents time (t). The diagram 1300 shows a communication symbol 1350. The communication symbol 1350 includes guard period 1355, which may comprise a CP portion 1332. The communication symbol 1350 also includes a payload portion 1334. The communication symbol 1350 comprises a number of different sub-carriers 1305 having a sub-carrier frequency spacing of 60 KHz, also called 60 KHz/tone, occupying a total frequency bandwidth 1307. The communication symbol 1350 begins at the symbol boundary 1215 and extends in time to the right. The first communication symbol 1210 and the second communication symbol 1220 of FIG. 12 have a length that is equal to the length of the communication symbol 1350 of FIG. 13.

In an exemplary embodiment, the communication symbol 1350 can be configured to carry the same information payload as the communication symbols 1210 and 1220 of FIG. 12, but can include an extended guard period 1355. The communication symbol 1350 occupies the same time duration, t1, as does the first and second communication symbols 1210 and 1220 of FIG. 12, and also occupies the same total frequency bandwidth as the communication symbols 1210 and 1220, that is, the total frequency bandwidth 1207 is the same as the total frequency bandwidth 1307. The extended guard period 1355 is longer than the CP period 1212 or the CP period 1222 of FIG. 12 and may provide a longer period of time for communication beam transition and CP information than either the CP period 1212 or the CP period 1222 of FIG. 12.

Figure 14:
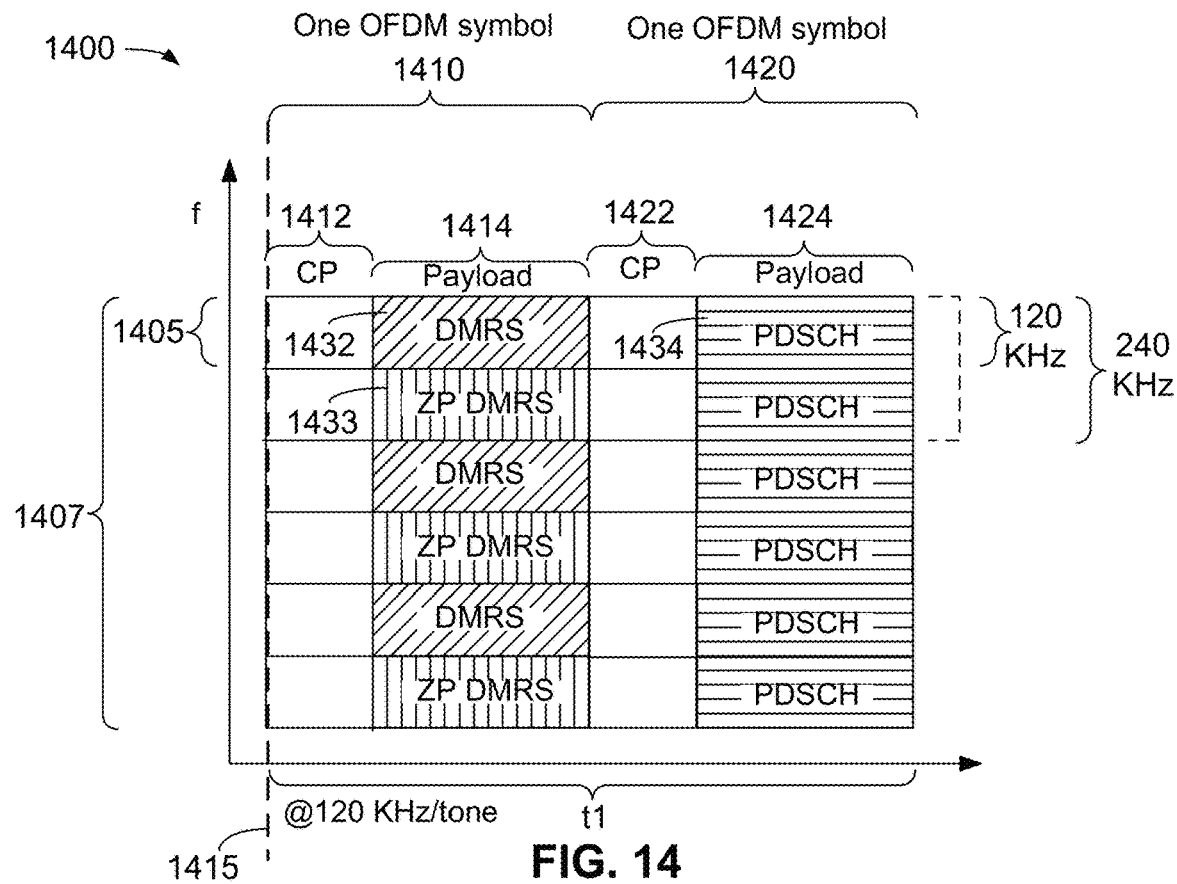
FIG. 14 is a diagram showing two communication symbols at a sub-carrier spacing of 120 KHz.

FIG. 14 is a diagram 1400 showing two communication symbols at a sub-carrier frequency spacing of 120 KHz. The vertical axis represent frequency (f) and the horizontal axis represents time (t). The diagram 1400 shows a first communication symbol 1410 and a second communication symbol 1420. The first communication symbol 1410 includes a CP portion 1412 and a payload portion 1414. The first communication symbol 1410 comprises a number of different sub-carriers 1405 having a sub-carrier frequency spacing of 120 KHz, also called 120 KHz/tone, occupying a total frequency bandwidth 1407. The first communication symbol 1410 begins at a symbol boundary 1415 and extends in time to the right. In an exemplary embodiment, the first communication symbol 1410 has a payload portion 1414 that carries a demodulation reference signal (DMRS) in sub-carrier 1432, and a zero power demodulation reference signal (ZP DMRS) in sub-carrier 1433. The first communication symbol 1410 also carries DMRS and ZP DMRS in the other unnumbered sub-carriers of the payload portion 1414 as shown in FIG. 14.

The second communication symbol 1420 includes a CP portion 1422 and a payload portion 1424. The second communication symbol 1420 also comprises a number of different sub-carriers 1405 having a sub-carrier frequency spacing of 120 KHz, also called 120 KHz/tone, and also occupies the total frequency bandwidth 1407. The second communication symbol 1420 has a payload portion 1424 that carries a physical downlink shared channel (PDSCH) in sub-carrier 1434. The second communication symbol 1420 also carries PDSCH in the other unnumbered sub-carriers of the payload portion 1424 as shown in FIG. 14.

Figure 15:
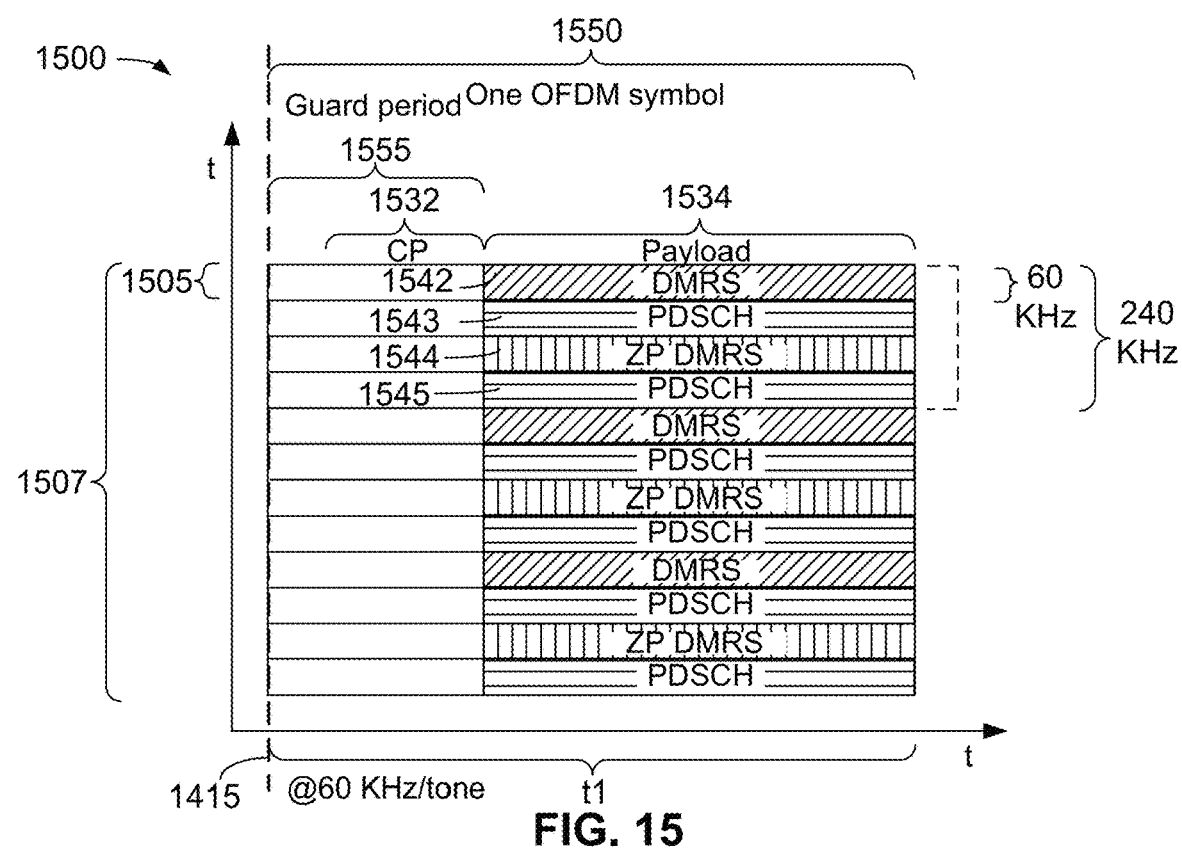
FIG. 15 is a diagram showing a communication symbol at a sub-carrier spacing of 60 KHz.

FIG. 15 is a diagram 1500 showing a communication symbol at a sub-carrier frequency spacing of 60 KHz. The vertical axis represent frequency (f) and the horizontal axis represents time (t). The diagram 1500 shows a communication symbol 1550. The communication symbol 1550 includes guard period 1555, which may comprise a CP portion 1532. The communication symbol 1550 also includes a payload portion 1534.

The communication symbol 1550 comprises a number of different sub-carriers 1505 having a sub-carrier frequency spacing of 60 KHz, also called 60 KHz/tone, occupying a total frequency bandwidth 1507. The communication symbol 1550 begins at the symbol boundary 1415 and extends in time to the right. In this example, the 12 sub-carriers 1505 in the payload portion 1534 comprise a resource block.

The communication symbol 1550 can be configured to carry the same information as the communication symbols 1410 and 1420 of FIG. 14, but can include an extended guard period 1555. The communication symbol 1550 occupies the same time duration, t1, as does the first and second communication symbols 1410 and 1420 of FIG. 14, and also occupies the same total frequency bandwidth as the communication symbols 1410 and 1420, that is, the total frequency bandwidth 1507 is the same as the total frequency bandwidth 1407. The extended guard period 1555 is longer than the CP period 1412 or the CP period 1422 and may provide a longer period of time for communication beam transition and CP information than either the CP period 1412 or the CP period 1422 of FIG. 14.

In an exemplary embodiment, the configuration of the communication symbol 1550 may be sent from a base station (gNB) to a UE in a signaling communication using one or more of a downlink control information (DCI) communication, a radio resource control (RRC) communication, a medium access control-control element (MAC-CE) communication, or another signaling communication.

In an exemplary embodiment, the communication symbol 1550 has a payload portion 1534 that carries a demodulation reference signal (DMRS) in sub-carrier 1542, a PDSCH in sub-carrier 1543, a zero power demodulation reference signal (ZP DMRS) in sub-carrier 1544 and a PDSCH in sub-carrier 1545. In accordance with an exemplary embodiment of the disclosure, the DMRS in sub-carrier 1432, the ZP DMRS in sub-carrier 1433, and the PDSCH in sub-carrier 1434 of the first and second communication symbols 1410 and 1420 in FIG. 14, are interleaved, or otherwise included in sub-carriers 1542, 1543, 1544 and 1545 of communication symbol 1550, such that the total frequency bandwidth of 240 KHz, in this example, occupied by the DMRS in sub-carrier 1432, the ZP DMRS in sub-carrier 1433, and the PDSCH in sub-carrier 1434, at 120 KHz sub-carrier frequency spacing as shown in FIG. 14, is the same as the total frequency bandwidth of 240 KHz, in this example, occupied by the DMRS in sub-carrier 1542, the PDSCH in sub-carrier 1543, the ZP DMRS in sub-carrier 1544 and the PDSCH in sub-carrier 1545 at 60 KHz sub-carrier frequency spacing as shown in FIG. 15. The payload of 1414 and payload of 1424 of the communication symbols 1410 and 1420 are frequency division multiplexed in the communication symbol 1550 in such a way that the interval in frequency between neighboring DMRS tones (sub-carriers) in communication symbol 1550 is maintained with respect to the frequency between neighboring DMRS tones in the communication symbol 1410 in FIG. 14. Therefore, channel estimation using the DMRS symbols before adjusting sub-carrier frequency spacing (FIG. 14) and after adjusting sub-carrier frequency spacing (FIG. 15) is expected to have the same resolution in the frequency domain. In an exemplary embodiment, the communication symbol 1550 may be referred to as a combined communication symbol in that it can be configured to include the information in the communication symbols 1410 and 1420 of FIG. 14. In an exemplary embodiment, the payload 1534 of the combined communication symbol 1550 is configured such that a minimum frequency interval between two sub-carriers that contain the payload of the pre-combined communication symbols 1410 and 1420 is maintained in the payload portion 1534 of the combined communication symbol 1550. Therefore, the same level of frequency diversity is expected from the PDSCH symbols before adjusting sub-carrier frequency spacing (FIG. 14) and after adjusting sub-carrier frequency spacing (FIG. 15) so that the same resolution in the frequency domain is maintained between the payload 1414 and 1424 of FIG. 14 and the payload 1534 of FIG. 15.

In an exemplary embodiment, the communication symbol 1410 may be referred to as a first pre-combined communication symbol and the communication symbol 1420 may be referred to as a second pre-combined communication symbol. The communication symbol 1410 and the communication symbol 1420 may be combined to form the combined communication symbol 1550. In an exemplary embodiment of a non-limiting example, in the payload 1534 of the combined communication symbol 1550, all even sub-carrier frequencies (such as the frequencies associated with the DMRS and ZP DMRS communications) may contain the payload 1414 from the first pre-combined communication symbol 1410, and all odd sub-carrier frequencies (such as the frequencies associated with the PDSCH communication) may contain the payload 1424 from the second pre-combined communication symbol 1420. The DMRS, PDSCH and ZP DMRS are also carried in the other unnumbered sub-carriers of the payload portion 1534 as shown in FIG. 15.

Figure 16:
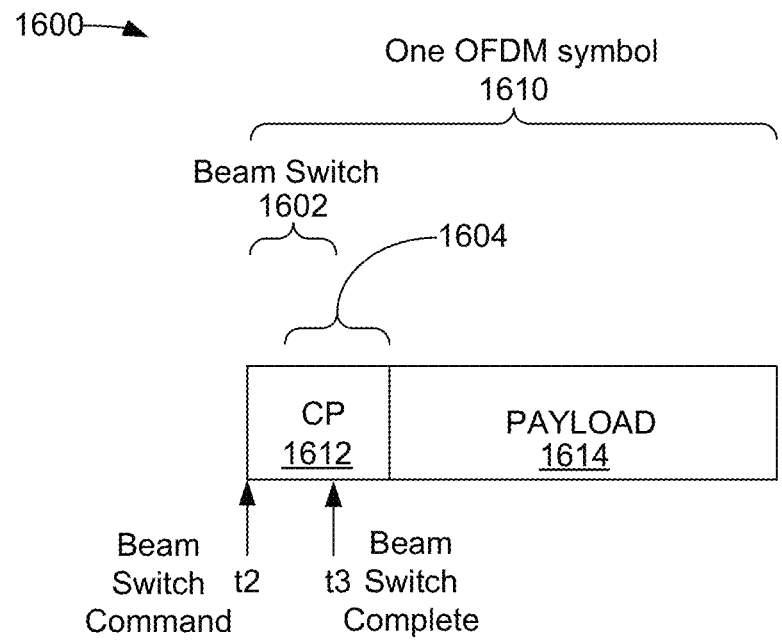
FIG. 16 is a diagram showing a communication symbol including a CP period in which a beam switch may occur.

FIG. 16 is a diagram 1600 showing a communication symbol including a CP period in which a beam switch may occur. The communication symbol 1610 includes a CP portion 1612 and a payload portion 1614. A beam switch time period is shown at 1602, beginning with a beam switch command at a time, t2, and a beam switch completion at a time t3. The time between t2 and t3 may also be referred to as a beam switch time, or beam transition time. If the beam switch time 1602 extends beyond the CP portion 1612, it may cause additional inter-symbol interference (ISI) leakage into the samples in the payload portion 1614. This may cause a loss of the circulant property in the CP-OFDM channel matrix (similar to ISI) due to channel delay taps being longer than the CP) and may cause error vector magnitude (EVM) loss and lower decoding rates. The effect of beam switching may be different for different types of symbols. If this leakage of the ISI beyond the CP portion 1612 into the payload portion 1614 occurs on a high priority symbol, such as a DMRS, the channel estimation may be corrupted, and the error may propagate to additional symbols.

Figure 17:
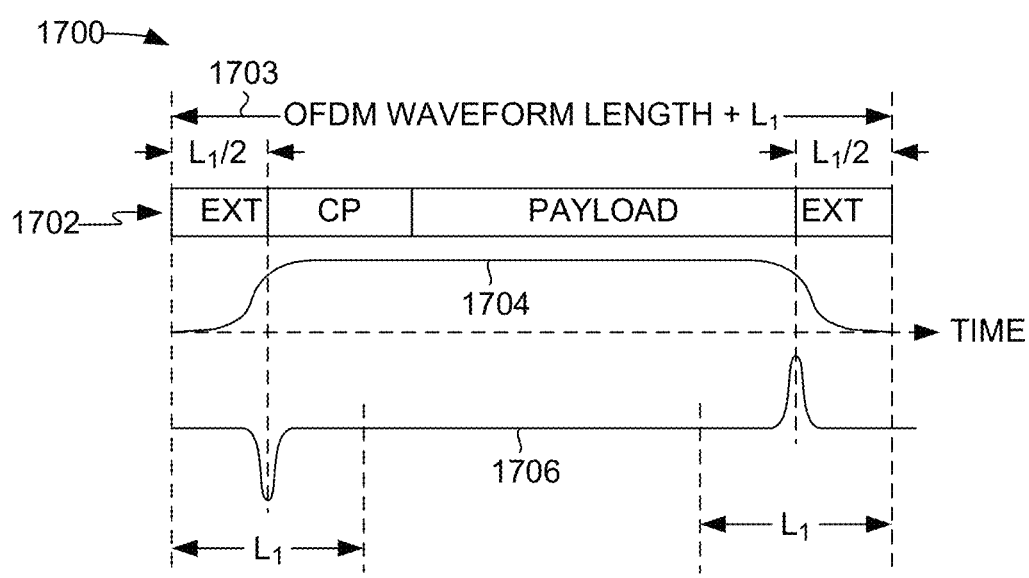
FIG. 17 is a diagram illustrating a communication symbol having a weighted overlap and add (WOLA) portion.

FIG. 17 is a diagram 1700 illustrating a communication symbol having a weighted overlap and add (WOLA) portion. The communication symbol includes an example of a head tone sub-symbol 1702 and a complex-valued sub-symbol weighting function comprising a real part 1704 and an imaginary part 1706. The extension (EXT) of sub-symbol 1702 may have a duration or length of $L_1$. The sub-symbol weighting function may be applied during a time interval 1703 (OFDM waveform length+extension length $L_1$) by, for example, the weighting function 430 (FIG. 4). Note that the extension of length $L_1$ extends a duration or time interval $L_1/2$ from the sub-symbol head and $L_1/2$ from the sub-symbol tail. That is, in FIG. 17, the notation "EXT" represents a time interval of one-half the extension. The notation "CP" denotes the cyclic prefix. The EXT time interval may be used for an overlap and add portion of a WOLA operation.

Figure 18:
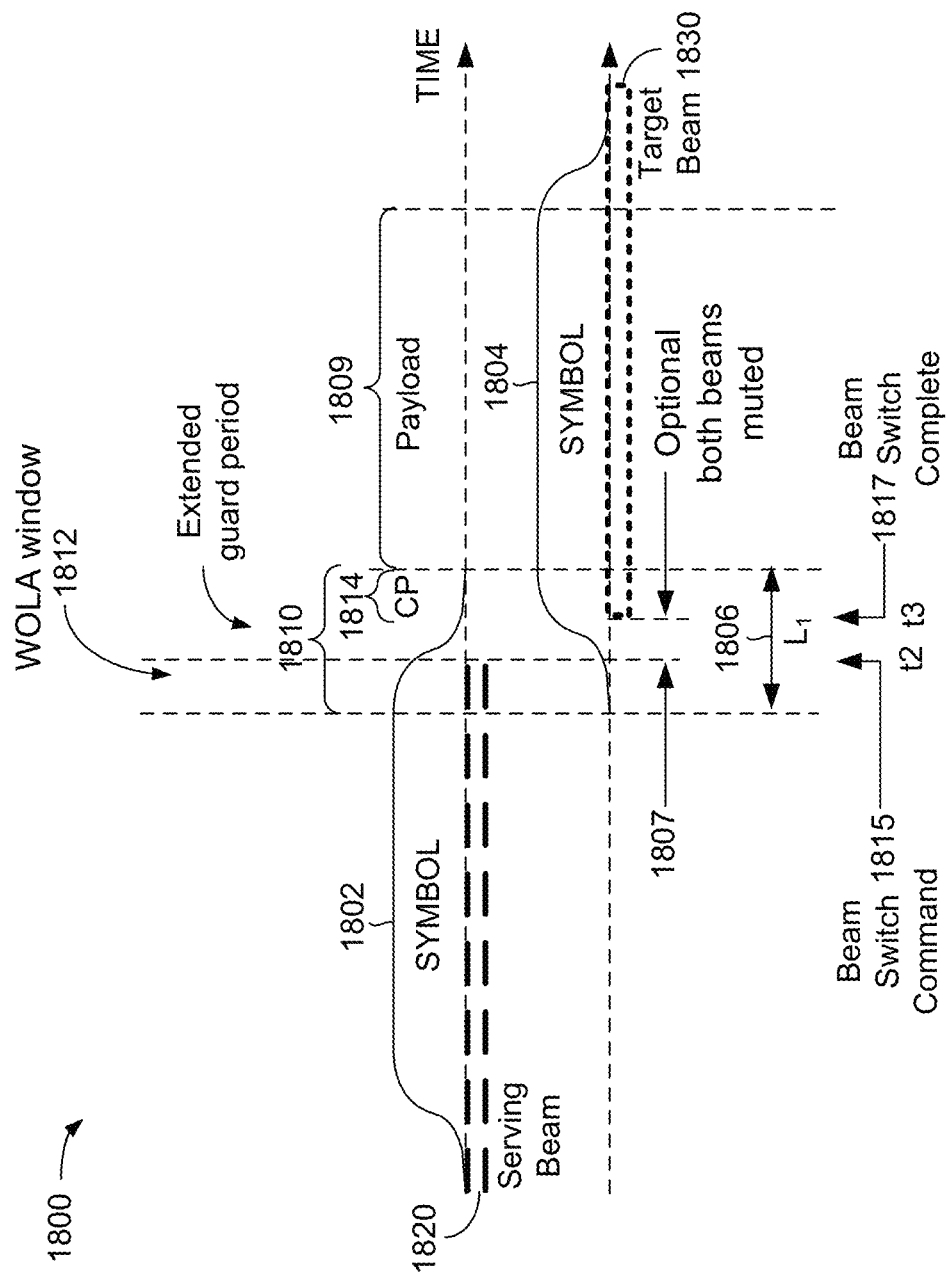
FIG. 18 is a diagram illustrating an example of an extended guard period associated with communication symbols in accordance with various aspects of the present disclosure.

FIG. 18 is a diagram 1800 illustrating an example of an extended guard period associated with communication symbols in accordance with various aspects of the present disclosure. The tail portion of a first symbol 1802 is overlapped with the head portion of a second symbol 1804 that immediately follows first symbol 1802 in time. The duration or length of the overlap interval 1806 may be referred to as $L_1$.

In an exemplary embodiment, an extended guard period 1810 may be created by adjusting the sub-carrier frequency spacing for the second symbol 1804 to a sub-carrier frequency spacing that is narrower, or smaller, than the sub-carrier frequency spacing of the first symbol 1802. For example, the first symbol 1802 may have a sub-carrier frequency spacing of 120 KHz and the second symbol 1804 may have a sub-carrier frequency spacing of 60 KHz. In an exemplary embodiment, a first communication beam 1820, which may be referred to as a serving beam, may be used for transmission of the first symbol 1802, while a second communication beam 1830, which may be referred to as a target beam, may be used for transmission of the second symbol 1804. In an exemplary embodiment, the communication beam switch from the first communication beam 1820 to the second communication beam 1830 may be configured to occur during the extended guard period 1810.

The extended guard period 1810 may comprise a WOLA window 1812 during which the above-described WOLA function may occur. The extended guard period 1810 may also comprise a CP period 1814. The extended guard period 1810 includes a time, t2, 1815 at which a beam switch command may be initiated to begin the beam transition, and a time, t3, 1817 by which the beam transition may be completed. The extended guard period 1810 may also optionally include a time period 1807 during which both the first communication beam 1820 and the second communication beam 1830 may be muted. In an exemplary embodiment, the time period 1807 may occur between the time t2, 1815 and the time t3, 1817. The time period 1807 may comprise a time period during which both the serving beam 1820 and the target beam 1830 are optionally muted, and in an exemplary embodiment, may also be shorter than the time between time t2, 1815 and time t3, 1817. In an exemplary embodiment, the time t2, 1815 should occur after the completion time of the WOLA window 1812. Further, at any point during the beam switching time (i.e., between the time t2, 1815 and the time t3, 1817), both the serving beam 1820 and the target beam 1830 may optionally be muted. In an exemplary embodiment, muting one or more of the serving beam 1820 and the target beam 1830 can reduce transmission power consumption, and may reduce possible inter-symbol-interference that may affect subsequent transmissions, and may reduce co-channel interference to other communication links, as the samples that would be sent/received during the muting time will not be used for decoding. The extended guard period 1810 may be sufficiently long to allow completion of the beam switch (shown being completed at time, t3, 1817) and the inclusion of a CP 1814 prior to the beginning of the payload period 1809.

Figure 19:
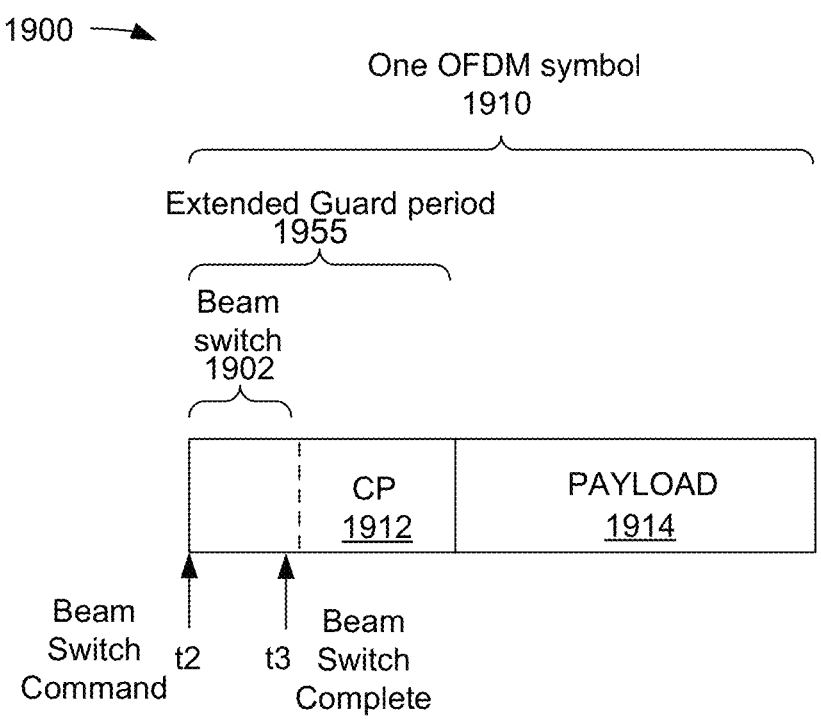
FIG. 19 is an example of an OFDM symbol having an extended guard period in accordance with various aspects of the present disclosure.

FIG. 19 is a drawing 1900 showing an example of an OFDM symbol having an extended guard period, within which a beam transition occurs and within which a CP may be applied to a communication symbol in accordance with various aspects of the present disclosure. The communication symbol 1910 includes an extended guard period 1955, which may include a beam switch time period 1902 and a CP portion 1912. A payload portion 1914 follows the CP portion 1912.

The beam switch time period 1902 begins with a beam switch command at a time, t2, and ends at a beam switch completion at a time t3. The time between t2 and t3 may also be referred to as a beam switch time. The extended guard period 1955 allows the beam switch time period 1902 to occur and complete, and then also allows a CP to be applied to the symbol 1910 prior to the beginning of the payload period 1914. In this manner, the extended guard period 1955 includes sufficient time for a beam transition to complete and also allows for time for a CP to be applied prior to the beginning of the payload portion 1914, while minimizing the possibility of any additional ISI that may result were the beam switch time to extend into the payload period 1914.

Figure 20:
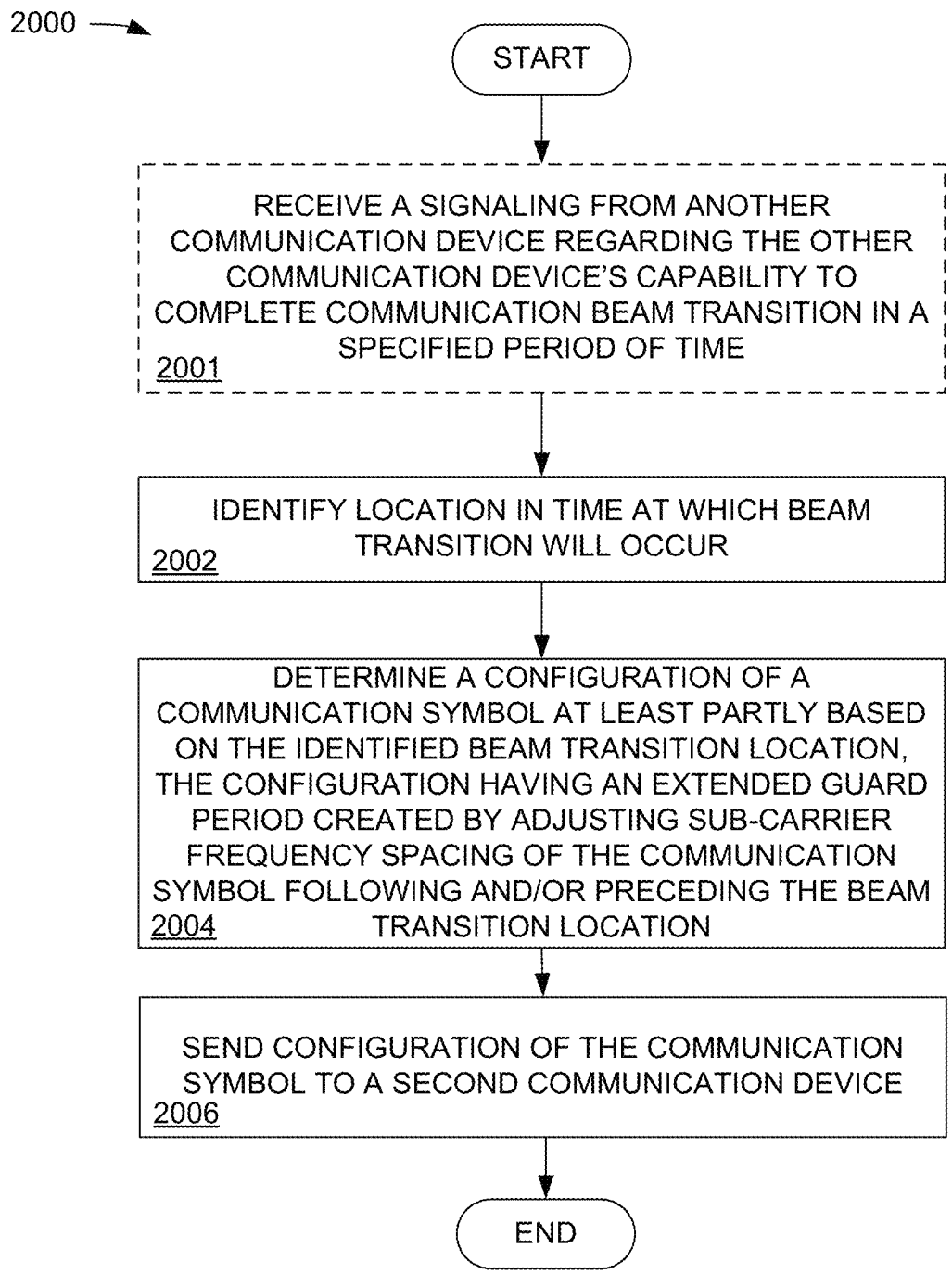
FIG. 20 is a flow diagram illustrating an example of a method for communication in accordance with various aspects of the present disclosure.

FIG. 20 is a flow chart illustrating an example of a method 2000 for communication in accordance with various aspects of the present disclosure. The blocks in the method 2000 may occur in the order shown, or may occur at least partly in parallel.

In block 2001, optionally, a communication device, such as a base station (gNB), may receive a signaling from another communication device, such as a UE, indicating the other communication device's capability to complete a communication beam transition in a specified period of time. The block 2001 is shown in dotted line in FIG. 20 to indicate that it is optional.

In block 2002, a location in time in a communication transmission time interval where a communication beam transition will occur is identified.

In block 2004, a configuration of a communication symbol is determined at least partly based on the identified beam transition location and a priority of the communication symbol, where in the configuration an extended guard period is created by changing the sub-carrier frequency spacing of at least one of the communication symbols following and/or preceding the beam transition location. In an exemplary embodiment, the determination of the symbol configuration may be at least in part based on the signaling received in optional block 2001.

In block 2006, the configuration of the communication symbol is sent in a signaling communication to a second communication device.

Figure 21:
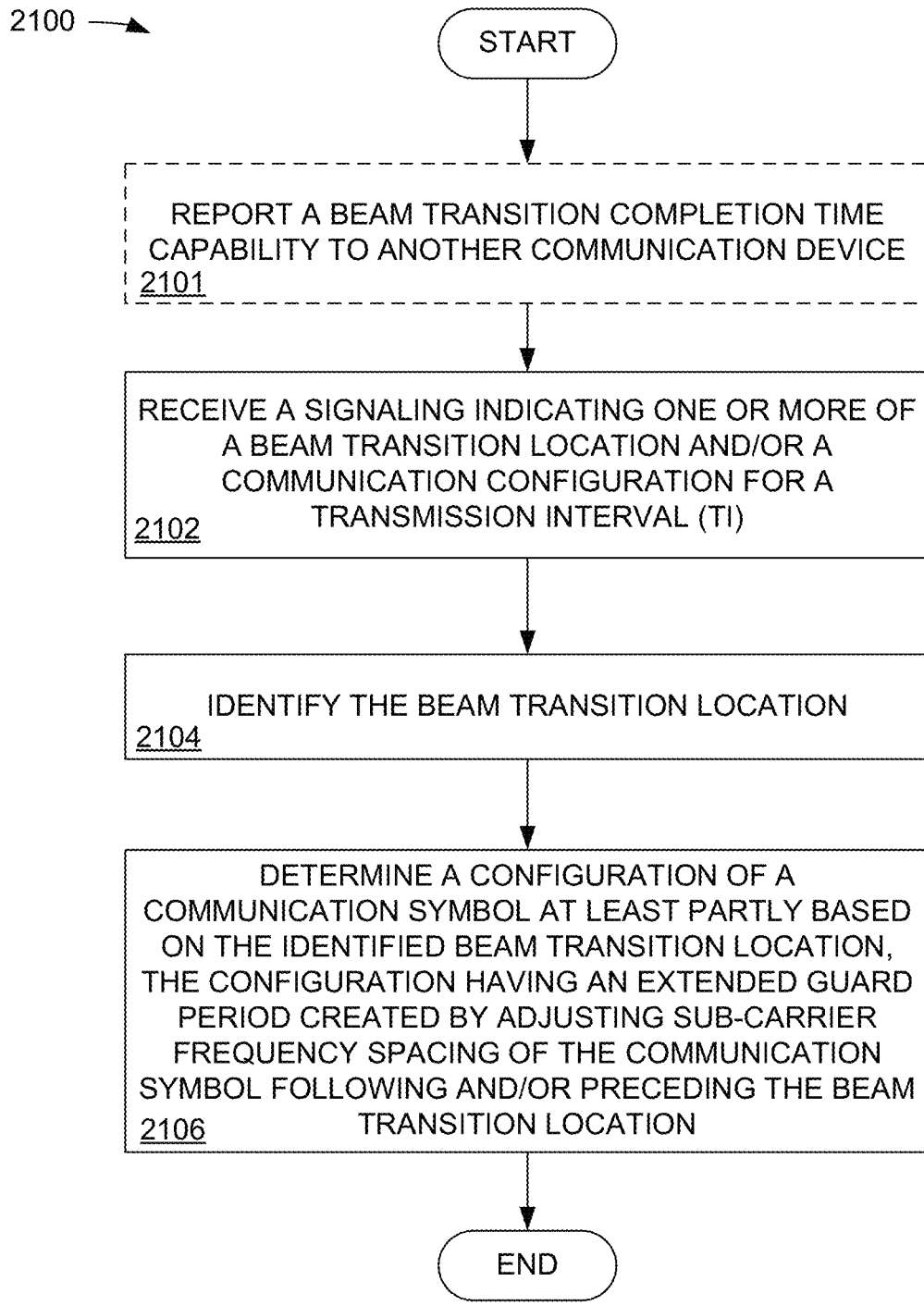
FIG. 21 is a flow diagram illustrating an example of a method for communication in accordance with various aspects of the present disclosure.

FIG. 21 is a flow chart illustrating an example of a method 2100 for communication in accordance with various aspects of the present disclosure. The blocks in the method 2100 may occur in the order shown, or may occur at least partly in parallel.

In block 2101, optionally, a communication device, such as a UE, may report a communication beam transition completion time capability to another communication device, such as to a base station (gNB). The block 2101 is shown in dotted line in FIG. 21 to indicate that it is optional.

In block 2102, a UE may receive a signaling indicating one or more of a beam transition location and/or a communication configuration for a transmission time interval (TTI).

In block 2104, a UE may identify the beam transition location at least in part based on the received signal in the TTI.

In block 2106, a UE may determine a configuration of a communication symbol at least partly based on the received signaling and/or a predefined method, where in the configuration an extended guard period is created by changing the sub-carrier frequency spacing of at least one of the symbols following and/or preceding the identified beam transition location, so that the sub-carrier frequency spacing for the symbol immediately following and/or preceding the beam transition location is different than the sub-carrier frequency spacing for a symbol that does not immediately precede and/or follow the beam transition location. In an exemplary embodiment, the communication configuration in block 2102 and/or the configuration determined in block 2106 may be at least partly determined by the capability reported in optional block 2101.

Figure 22:
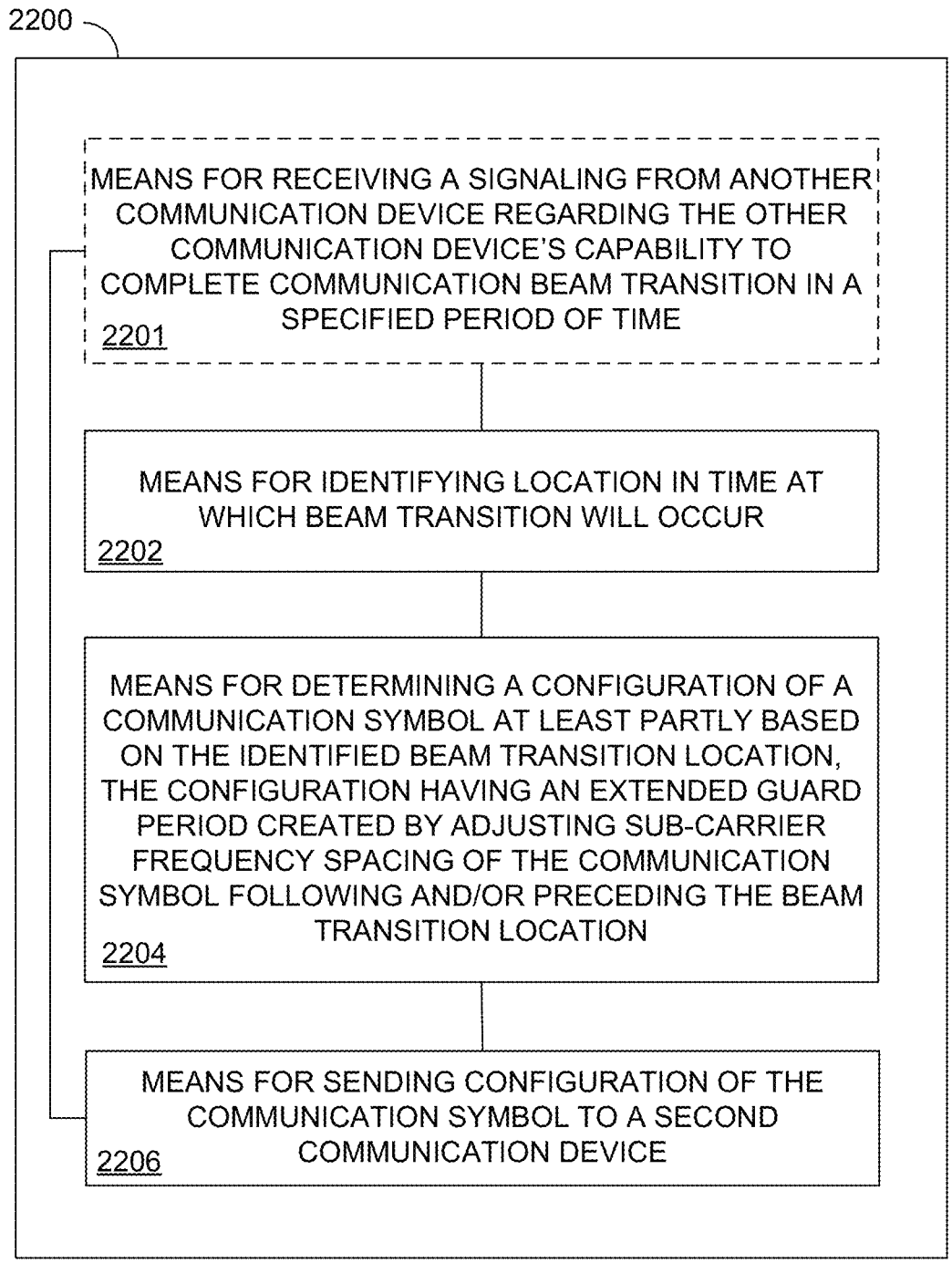
FIG. 22 is a functional block diagram illustrating a device for communication, in accordance with various aspects of the present disclosure.

FIG. 22 is a functional block diagram illustrating an apparatus 2200 for adjusting sub-carrier frequency spacing in accordance with various aspects of the present disclosure. The apparatus 2200 comprises optional means 2201 for receiving a signaling from another communication device, such as a UE, indicating the other communication device's capability to complete a communication beam transition in a specified period of time. In certain embodiments, the optional means 2201 for receiving a signaling from another communication device can be configured to perform one or more of the function described in operation block 2001 of method 2000 (FIG. 20). In an exemplary embodiment, the optional means 2201 for receiving a signaling from another communication device may comprise a base station (gNB) 800 (FIG. 8) receiving a signaling communication from a UE 900 (FIG. 9) indicating the UE's capability to complete a communication beam transition in a specified period of time. The means 2201 is shown in dotted line in FIG. 22 to indicate that it is optional.

The apparatus 2200 further comprises means 2202 for identifying a location in time in a communication transmission time interval where a communication beam transition will occur. In certain embodiments, the means 2202 for identifying a location in time in a communication transmission time interval where a communication beam transition will occur can be configured to perform one or more of the function described in operation block 2002 of method 2000 (FIG. 20). In an exemplary embodiment, the means 2202 for identifying a location in time in a communication transmission time interval where a communication beam transition will occur may comprise a base station (gNB) 800 (FIG. 8) identifying a communication beam transition time and/or location.

The apparatus 2200 further comprises means 2204 for determining a configuration of a communication symbol at least partly based on the identified beam transition location and a priority of the communication symbol, where in the configuration an extended guard period is created by changing the sub-carrier frequency spacing of at least one of the communication symbols following and/or preceding the beam transition location. In certain embodiments, the means 2204 for determining a configuration of a communication symbol can be configured to perform one or more of the function described in operation block 2004 of method 2000 (FIG. 20). In an exemplary embodiment, the means 2204 for determining a configuration of a communication symbol may comprise the base station (gNB) 800 (FIG. 8) determining whether to adjust sub-carrier frequency spacing of one or more communication symbols following and/or preceding the beam transition time.

The apparatus 2200 further comprises means 2206 for sending the configuration of the communication symbol in a signaling communication to a second communication device. In certain embodiments, the means 2206 for sending the configuration of the communication symbol in a signaling communication to a second communication device can be configured to perform one or more of the function described in operation block 2006 of method 2000 (FIG. 20). In an exemplary embodiment, the means 2206 for sending the configuration of the communication symbol in a signaling communication to a second communication device may comprise the base station (gNB) 800 (FIG. 8) sending the configuration of the communication symbol in a signaling to a UE 900 (FIG. 9).

Figure 23:
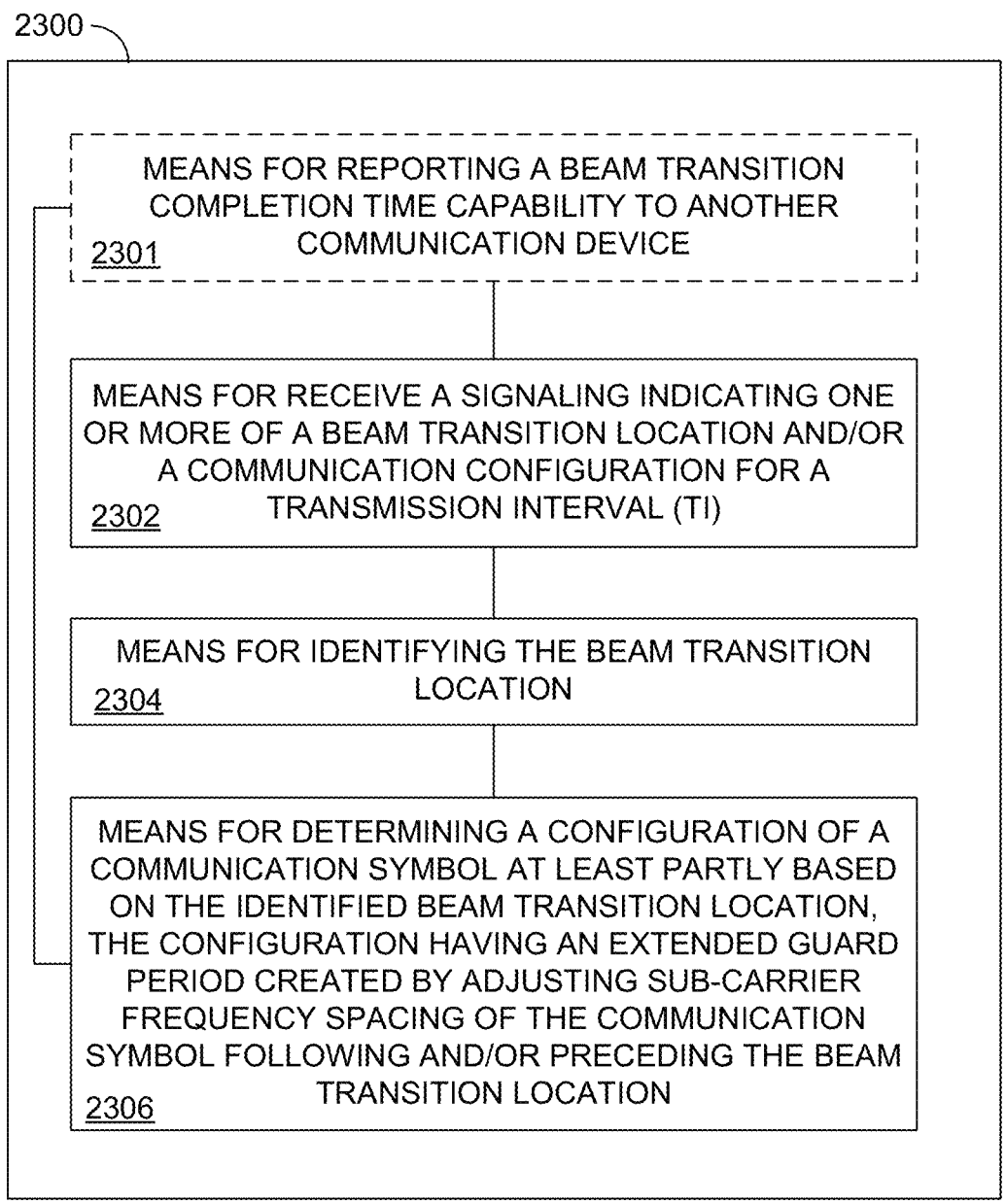
FIG. 23 is a functional block diagram illustrating a device for communication, in accordance with various aspects of the present disclosure.

FIG. 23 is a functional block diagram illustrating an apparatus 2300 for adjusting sub-carrier frequency spacing in accordance with various aspects of the present disclosure. The apparatus 2300 comprises optional means 2301 for reporting a communication beam transition completion time capability to another communication device. In certain embodiments, the optional means 2301 for reporting a communication beam transition completion time capability to another communication device can be configured to perform one or more of the function described in operation block 2101 of method 2100 (FIG. 21). In an exemplary embodiment, the optional means 2301 for reporting a communication beam transition completion time capability to another communication device may comprise a UE (FIG. 9) reporting its capability to complete a communication beam transition in a specified period of time to a base station (gNB) 800 (FIG. 8). The means 2301 is shown in dotted line in FIG. 23 to indicate that it is optional.

The apparatus 2300 comprises means 2302 for receiving a signaling indicating one or more of a beam transition location and/or a communication configuration for a transmission time interval (TTI). In certain embodiments, the means 2302 for receiving a signaling indicating one or more of a beam transition location and/or a communication configuration for a transmission time interval (TTI) can be configured to perform one or more of the function described in operation block 2102 of method 2100 (FIG. 21). In an exemplary embodiment, the means 2302 for receiving a signaling indicating one or more of a beam transition location and/or a communication configuration for a transmission time interval (TTI) may comprise a UE 900 (FIG. 9) receiving a signaling indicating one or more of a beam transition location and/or a communication configuration for a transmission time interval (TTI) from a base station (gNB) 800 (FIG. 8).

The apparatus 2300 further comprises means 2304 for identifying the beam transition location at least in part based on the received signal in the TI. In certain embodiments, the means 2304 for identifying the beam transition location at least in part based on the received signal in the TI can be configured to perform one or more of the function described in operation block 2104 of method 2100 (FIG. 21). In an exemplary embodiment, the means 2304 for identifying the beam transition location at least in part based on the received signal in the TI may comprise a UE 900 (FIG. 9) identifying the beam transition location.

The apparatus 2300 further comprises means 2306 for determining a configuration of a communication symbol at least partly based on the received signaling and/or a predefined method, where in the configuration an extended guard period is created by changing the sub-carrier frequency spacing of at least one of the symbols following and/or preceding the identified beam transition location, so that the sub-carrier frequency spacing for the symbol immediately following and/or preceding the beam transition location is different than the sub-carrier frequency spacing for a symbol that does not immediately precede and/or follow the beam transition location. In certain embodiments, the means 2306 for determining a configuration of a communication symbol can be configured to perform one or more of the function described in operation block 2106 of method 2100 (FIG. 21). In an exemplary embodiment, the means 2306 for determining a configuration of a communication symbol may comprise a UE 900 (FIG. 9) determining a configuration of a communication symbol.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The detailed description set forth above in connection with the appended drawings describes examples and does not represent the only examples that may be implemented or that are within the scope of the claims. The terms "example" and "exemplary," when used in this description, mean "serving as an example, instance, or illustration," and do not mean "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Non-transitory computer-readable media include both computer storage media and communication media including any non-transitory medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. "Disk" and "disc," as used may be herein, include compact disc (CD), laser disc, optical disc, digital versatile disc (DVD), floppy disk, and Blu-ray disc, where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Therefore, although selected aspects have been illustrated and described in detail, it will be understood that various substitutions and alterations may be made therein without departing from the spirit and scope of the present invention, as defined by the following claims.

What is claimed is:

1. A method for adjusting communication symbol sub-carrier frequency spacing based on a communication symbol priority at a communication beam transition location, comprising:
   identifying a communication beam transition location in time in a communication transmission time interval (TTI) where a communication beam transition will occur; and
   determining a configuration of a communication symbol at least partly based on the identified communication beam transition location and a priority of the communication symbol, the configuration comprising an extended guard period created by adjusting the sub-carrier frequency spacing of at least one of the symbols that occurs at least one of immediately following the communication beam transition location and immediately preceding the communication beam transition location, so that the sub-carrier frequency spacing for the symbol that occurs at least one of immediately following the communication beam transition location and immediately preceding the communication beam transition location is different than a sub-carrier frequency spacing for a symbol that does not at least one of immediately precede the communication beam transition location and immediately follow the communication beam transition location.

2. The method of claim 1, wherein the extended guard period comprises a weighted overlap and add (WOLA) period configured to allow a WOLA window to complete for a serving communication beam, during which a target communication beam is muted.

3. The method of claim 1, wherein the extended guard period comprises a beam muting period where a serving communication beam and a target communication beam are muted, during which the serving communication beam is switched to the target communication beam.

4. The method of claim 1, wherein the extended guard period comprises a cyclic prefix (CP) period where a CP is transmitted on a target communication beam.

5. The method of claim 1, wherein a length of the extended guard period is determined such that a symbol boundary of a communication symbol having the extended guard period is the same as the symbol boundary of a communication symbol in a configuration without creating the extended guard period by changing the sub-carrier frequency spacing.

6. The method of claim 1, wherein the determining a configuration of a communication symbol is at least partly based on a communication device's capability to complete the communication beam transition in a specified period of time.

7. The method of claim 1, further comprising at least one of sending and receiving the communication symbol having the adjusted sub-carrier frequency spacing based on the identified configuration.

8. The method of claim 1, wherein a communication symbol having at least one of a demodulation reference signal (DMRS), channel state information-reference signal (CSI-RS), and a communication having a modulation and coding scheme (MCS) having a high reliability requirement, is considered a high priority communication symbol.

9. The method of claim 1, wherein the communication beam transition comprises a change in a transmission configuration indicator (TCI) of the transmission.

10. The method of claim 1, wherein the configuration of the communication symbol is sent to a second communication device using a signaling communication comprising at least one of a DCI communication, an RRC communication, and a MAC-CE communication.

11. The method of claim 1, wherein the extended guard period is created such that a length of a communication symbol having the adjusted sub-carrier frequency spacing following the beam transition location is the same length as multiple communication symbols having a non-adjusted sub-carrier frequency spacing.

12. The method of claim 1, wherein a plurality of communication symbols following the beam transition location are combined into a single combined communication symbol having the adjusted sub-carrier frequency spacing after the beam transition location and a payload of the communication symbols following the beam transition location are multiplexed in frequency in the combined communication symbol.

13. The method of claim 12, wherein a payload of the combined communication symbol is arranged such that a minimum frequency interval between two sub-carriers that contain the payload of a pre-combined communication symbol is maintained in the payload of the combined communication symbol.

14. The method of claim 13, wherein a first pre-combined communication symbol and a second pre-combined communication symbol are combined to form the combined communication symbol, and in a payload of the combined communication symbol, all even sub-carrier frequencies contain a payload from the first pre-combined communication symbol, and all odd sub-carrier frequencies contain a payload from the second pre-combined communication symbol.

15. A method for adjusting communication symbol sub-carrier frequency spacing based on a communication symbol priority at a communication beam transition location, comprising:
receiving a signaling indicating at least one of a communication beam transition location and a communication configuration for a transmission time interval (TTI);
identifying the communication beam transition location at least in part based on the received signal in the TTI; and
determining a configuration of a communication symbol at least partly based on at least one of the received signaling and a predefined method, the configuration comprising an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

16. The method of claim 15, further comprising reporting a beam switch completion time capability.

17. The method of claim 15, further comprising at least one of sending and receiving a communication symbol based on the determined configuration.

18. The method of claim 15, wherein the extended guard period comprises one or more of:
a weighted overlap and add (WOLA) period configured to allow a WOLA window to complete for a serving communication beam, during which a target communication beam is muted;
a beam muting period where the serving communication beam and the target communication beam are muted, during which the serving communication beam is switched to the target communication beam; and
a cyclic prefix (CP) period where a CP is transmitted on the target communication beam.

19. The method of claim 15, wherein a length of the extended guard period is determined such that a symbol boundary of a communication symbol having the extended guard period is the same as the symbol boundary of a communication symbol in a configuration without creating the extended guard period by changing the sub-carrier frequency spacing.

20. The method of claim 15, wherein the determining a configuration of a communication symbol is at least partly based on a communication device's capability to complete the communication beam transition in a specified period of time.

21. The method of claim 15, further comprising one or more of sending and receiving the communication symbol having the adjusted sub-carrier frequency spacing based on the identified configuration.

22. The method of claim 15, wherein a communication symbol having at least one of a demodulation reference signal (DMRS), channel state information-reference signal (CSI-RS), and a communication having a modulation and coding scheme (MCS) having a high reliability requirement, is considered a high priority communication symbol.

23. The method of claim 15, wherein the communication beam transition comprises a change in a transmission configuration indicator (TCI) of the transmission.

24. The method of claim 15, wherein the extended guard period is created such that a length of a communication symbol having the adjusted sub-carrier frequency spacing following the communication beam transition location is the same length as multiple communication symbols having a non-adjusted sub-carrier frequency spacing.

25. The method of claim 15, wherein a plurality of communication symbols following the communication beam transition location are combined into a single combined communication symbol having the adjusted sub-carrier frequency spacing after the communication beam transition location and a payload of the communication symbols following the communication beam transition location are multiplexed in frequency in the combined communication symbol.

26. The method of claim 25, wherein a payload of the combined communication symbol is arranged such that a minimum frequency interval between two sub-carriers that contain the payload of a pre-combined communication symbol is maintained in the payload of the combined communication symbol.

27. The method of claim 26, wherein a first pre-combined communication symbol and a second pre-combined communication symbol are combined to form the combined communication symbol, and in a payload of the combined communication symbol, all even sub-carrier frequencies contain a payload from the first pre-combined communication symbol, and all odd sub-carrier frequencies contain a payload from the second pre-combined communication symbol.

28. An apparatus for adjusting communication symbol sub-carrier frequency spacing based on a communication symbol priority at a communication beam transition location, comprising:
   means for identifying a communication beam transition location in time in a communication transmission time interval (TTI) where a communication beam transition will occur; and
   means for determining a configuration of a communication symbol at least partly based on the identified communication beam transition location and a priority of the communication symbol, the configuration comprising an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

29. An apparatus for adjusting communication symbol sub-carrier frequency spacing based on a communication symbol priority at a communication beam transition location, comprising:
   means for receiving a signaling indicating at least one of a communication beam transition location and a communication configuration for a transmission time interval (TTI);
   means for identifying the communication beam transition location at least in part based on the received signal in the TI; and
   means for determining a configuration of a communication symbol at least partly based on at least one of the received signaling and a predefined method, the configuration comprising an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

30. An apparatus for adjusting communication symbol sub-carrier frequency spacing based on a communication symbol priority at a communication beam transition location, comprising:
   a memory;
   a processor coupled to the memory, the memory and the processor configured to:
   identify a communication beam transition location in time in a communication transmission time interval (TTI) where a communication beam transition will occur; and
   determine a configuration of a communication symbol at least partly based on the identified communication beam transition location and a priority of the communication symbol, the configuration comprising an extended guard period created by adjusting the sub-carrier frequency spacing of at least one of the symbols that occurs at least one of immediately following the communication beam transition location and immediately preceding the communication beam transition location, so that the sub-carrier frequency spacing for the symbol that occurs at least one of immediately following the communication beam transition location and immediately preceding the communication beam transition location is different than a sub- carrier frequency spacing for a symbol that does not at least one of immediately precede the communication beam transition location and immediately follow the communication beam transition location.

31. The apparatus of claim 30, wherein the extended guard period comprises a weighted overlap and add (WOLA) period and the memory and the processor are further configured to allow a WOLA window to complete for a serving communication beam, during which a target communication beam is muted.

32. The apparatus of claim 30, wherein the extended guard period comprises a beam muting period where a serving communication beam and a target communication beam are muted, during which the memory and the processor are further configured to switch the serving communication beam to the target communication beam.

33. The apparatus of claim 30, wherein the extended guard period comprises a cyclic prefix (CP) period where the memory and the processor are further configured to transmit a CP on a target communication beam.

34. The apparatus of claim 30, wherein the memory and the processor are further configured to determine a length of the extended guard period such that a symbol boundary of a communication symbol having the extended guard period is the same as the symbol boundary of a communication symbol in a configuration without creating the extended guard period by changing the sub-carrier frequency spacing.

35. The apparatus of claim 30, wherein the memory and the processor are configured to determine a configuration of a communication symbol at least partly based on a communication device's capability to complete the communication beam transition in a specified period of time.

36. The apparatus of claim 30, wherein the memory and the processor are further configured to at least one of send and receive the communication symbol having the adjusted sub-carrier frequency spacing based on the identified configuration.

37. The apparatus of claim 30, wherein a communication symbol having at least one of a demodulation reference signal (DMRS), channel state information-reference signal (CSI-RS), and a communication having a modulation and coding scheme (MCS) having a high reliability requirement, is considered a high priority communication symbol.

38. The apparatus of claim 30, wherein the communication beam transition comprises a change in a transmission configuration indicator (TCI) of the transmission.

39. The apparatus of claim 30, wherein the memory and the processor are further configured to send the configuration of the communication symbol to a second communication device using a signaling communication comprising at least one of a DCI communication, an RRC communication, and a MAC-CE communication.

40. The apparatus of claim 30, wherein the memory and the processor are further configured to create the extended guard period such that a length of a communication symbol having the adjusted sub-carrier frequency spacing following the beam transition location is the same length as multiple communication symbols having a non-adjusted sub-carrier frequency spacing.

41. The apparatus of claim 30, wherein the memory and the processor are further configured to combine a plurality of communication symbols following the beam transition location into a single combined communication symbol having the adjusted sub-carrier frequency spacing after the beam transition location and wherein the memory and the processor are further configured to multiplex in frequency a payload of the communication symbols following the beam transition location in the combined communication symbol.

42. The apparatus of claim 41, wherein the memory and the processor are further configured to arrange a payload of the combined communication symbol such that a minimum frequency interval between two sub-carriers that contain the payload of a pre- combined communication symbol is maintained in the payload of the combined communication symbol.

43. The apparatus of claim 42, wherein the memory and the processor are further configured to combine a first pre-combined communication symbol and a second pre-combined communication symbol to form the combined communication symbol, and in a payload of the combined communication symbol, all even sub-carrier frequencies contain a payload from the first pre-combined communication symbol, and all odd sub-carrier frequencies contain a payload from the second pre-combined communication symbol.

44. An apparatus for adjusting communication symbol sub-carrier frequency spacing based on a communication symbol priority at a communication beam transition location, comprising:
 a memory;
 a processor coupled to the memory, the memory and the processor configured to:
 receive a signaling indicating at least one of a communication beam transition location and a communication configuration for a transmission time interval (TTI);
 identify the communication beam transition location at least in part based on the received signal in the TTI; and
 determine a configuration of a communication symbol at least partly based on at least one of the received signaling and a predefined method, the configuration comprising an extended guard period created by changing the sub-carrier frequency spacing of at least one of the symbols that occurs at least one of immediately following the communication beam transition location and immediately preceding the communication beam transition location, so that the sub-carrier frequency spacing for the symbol at least one of immediately following the communication beam transition location and immediately preceding the communication beam transition location is different than the sub-carrier frequency spacing for a symbol that does not at least one of immediately precede the communication beam transition location and immediately follow the communication beam transition location.

45. The apparatus of claim 44, wherein the memory and the processor are further configured to report a beam switch completion time capability.

46. The apparatus of claim 44, wherein the memory and the processor are further configured to at least one of send and receive a communication symbol based on the determined configuration.

47. The apparatus of claim 44, wherein the extended guard period comprises one or more of:
 a weighted overlap and add (WOLA) period configured to allow a WOLA window to complete for a serving communication beam, during which a target communication beam is muted;
 a beam muting period where the serving communication beam and the target communication beam are muted, during which the serving communication beam is switched to the target communication beam; and
 a cyclic prefix (CP) period where a CP is transmitted on the target communication beam.

48. The apparatus of claim 44, wherein the memory and the processor are further configured to determine a length of the extended guard period such that a symbol boundary of a communication symbol having the extended guard period is the same as the symbol boundary of a communication symbol in a configuration without creating the extended guard period by changing the sub-carrier frequency spacing.

49. The apparatus of claim 44, wherein the memory and the processor are configured to determine a configuration of a communication symbol at least partly based on a communication device's capability to complete the communication beam transition in a specified period of time.

50. The apparatus of claim 44, wherein the memory and the processor are further configured to one or more of send and receive the communication symbol having the adjusted sub-carrier frequency spacing based on the identified configuration.

51. The apparatus of claim 44, wherein a communication symbol having at least one of a demodulation reference signal (DMRS), channel state information-reference signal (CSI-RS), and a communication having a modulation and coding scheme (MCS) having a high reliability requirement, is considered a high priority communication symbol.

52. The apparatus of claim 44, wherein the communication beam transition comprises a change in a transmission configuration indicator (TCI) of the transmission.

53. The apparatus of claim 44, wherein the memory and the processor are further configured to create the extended guard period such that a length of a communication symbol having the adjusted sub-carrier frequency spacing following the communication beam transition location is the same length as multiple communication symbols having a non-adjusted sub-carrier frequency spacing.

54. The apparatus of claim 44, wherein the memory and the processor are further configured t combine a plurality of communication symbols following the communication beam transition location into a single combined communication symbol having the adjusted sub-carrier frequency spacing after the communication beam transition location and the memory and the processor are further configured to multiplex in frequency a payload of the communication symbols following the communication beam transition location in the combined communication symbol.

55. The apparatus of claim 54, wherein the memory and the processor are further configured to arrange a payload of the combined communication symbol such that a minimum frequency interval between two sub-carriers that contain the payload of a pre- combined communication symbol is maintained in the payload of the combined communication symbol.

56. The apparatus of claim 55, wherein the memory and the processor are further configured to combine a first pre-combined communication symbol and a second pre-combined communication symbol to form the combined communication symbol, and in a payload of the combined communication symbol, all even sub-carrier frequencies contain a payload from the first pre-combined communication symbol, and all odd sub-carrier frequencies contain a payload from the second pre-combined communication symbol.

* * * * *